(12) United States Patent
Koito et al.

(10) Patent No.: US 10,502,970 B2
(45) Date of Patent: Dec. 10, 2019

(54) DISPLAY DEVICE

(71) Applicant: Japan Display Inc., Minato-ku (JP)

(72) Inventors: Takeo Koito, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/942,619

(22) Filed: Apr. 2, 2018

(65) Prior Publication Data

US 2018/0284469 A1 Oct. 4, 2018

(30) Foreign Application Priority Data

Apr. 4, 2017 (JP) .................................. 2017-074625

(51) Int. Cl.
*G02B 27/22* (2018.01)
*G02F 1/133* (2006.01)
*G02F 1/1335* (2006.01)
*G02F 1/29* (2006.01)
*G02B 5/124* (2006.01)
(Continued)

(52) U.S. Cl.
CPC ......... *G02B 27/2292* (2013.01); *G02B 5/124* (2013.01); *G02B 27/0018* (2013.01); *G02F 1/13306* (2013.01); *G02F 1/13362* (2013.01); *G02F 1/13471* (2013.01); *G02F 1/133526* (2013.01); *G02F 1/133536* (2013.01); *G02F 1/133553* (2013.01); *G02F 1/134363* (2013.01); *G02F 1/29* (2013.01); *G02F 1/1337* (2013.01); *G02F 1/1368* (2013.01); *G02F 1/13439* (2013.01); *G02F 1/133345* (2013.01); *G02F 1/133512* (2013.01); *G02F 1/133514* (2013.01); *G02F 1/136286* (2013.01); *G02F 2001/133562* (2013.01); *G02F 2001/133565* (2013.01); *G02F 2001/133738* (2013.01); *G02F 2203/01* (2013.01); *G02F 2203/07* (2013.01); *G02F 2203/09* (2013.01)

(58) Field of Classification Search
CPC .................................................. G02B 27/2292
See application file for complete search history.

(56) References Cited

U.S. PATENT DOCUMENTS

2010/0182572 A1\* 7/2010 Huang ............... G02B 27/1066 353/20
2011/0285965 A1 11/2011 Sugiyama
2018/0284470 A1\* 10/2018 Yamamoto ......... G02B 27/2292

FOREIGN PATENT DOCUMENTS

JP 2011-242729 12/2011
JP 2011-253128 12/2011

\* cited by examiner

*Primary Examiner* — Edmond C Lau
(74) *Attorney, Agent, or Firm* — Oblon, McClelland, Maier & Neustadt, L.L.P.

(57) ABSTRACT

According to one embodiment, a display device comprises a light modulating element which transmits or reflects incident light, a display unit which emits display light toward the light modulating element, and a retroreflective element which retroreflects the display light reflected from the light modulating element, the light modulating element including an inner surface on a side opposed to the display unit and the retroreflective element, and an outer surface on a side opposite to the inner surface, the light modulating element includes a first mode of transmitting light incident from the outer surface at a first transmittance, and a second mode of transmitting the light incident from the outer surface at a second transmittance lower than the first transmittance.

16 Claims, 21 Drawing Sheets

(51) Int. Cl.
  G02B 27/00  (2006.01)
  G02F 1/1343  (2006.01)
  G02F 1/1347  (2006.01)
  *G02F 1/1368*  (2006.01)
  *G02F 1/1362*  (2006.01)
  *G02F 1/1333*  (2006.01)
  *G02F 1/1337*  (2006.01)

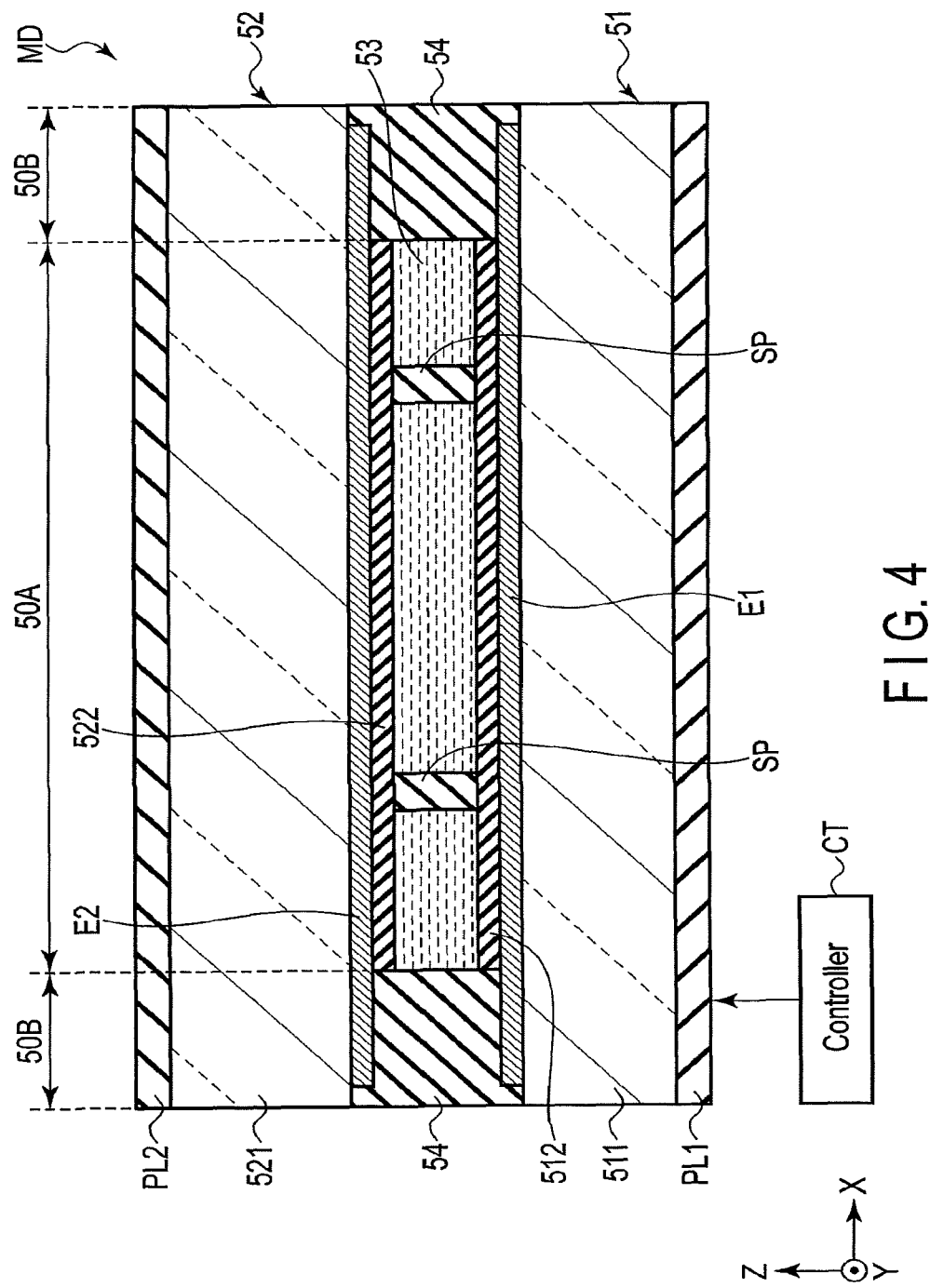
F I G. 4

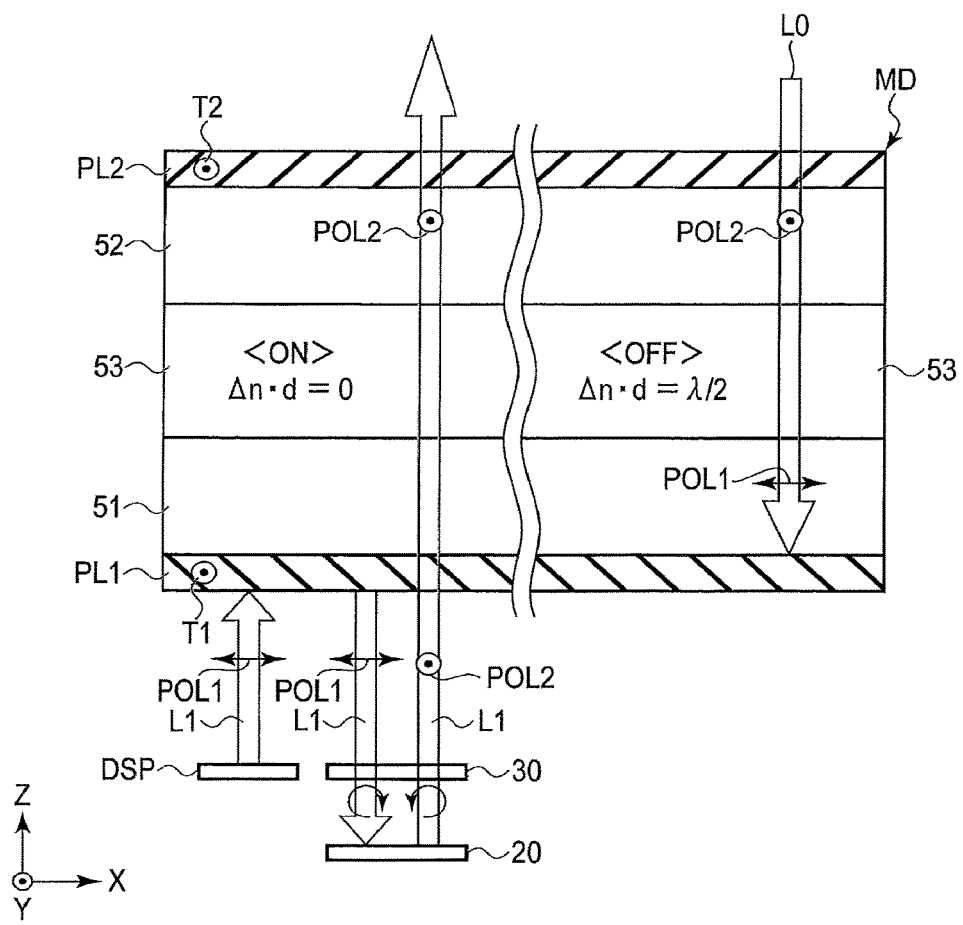
F I G. 8

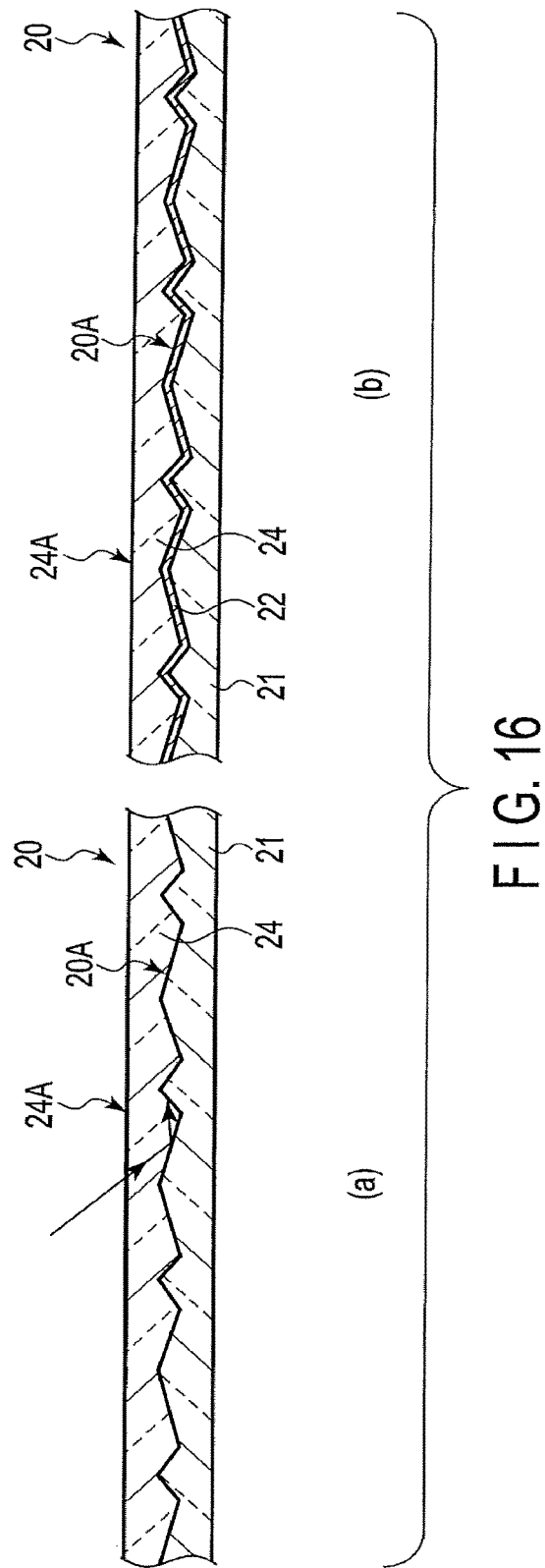
F I G. 16

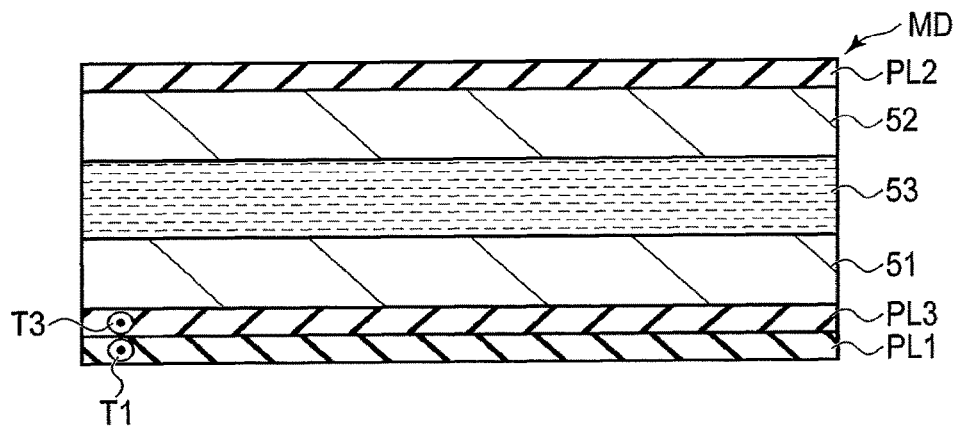
F I G. 17
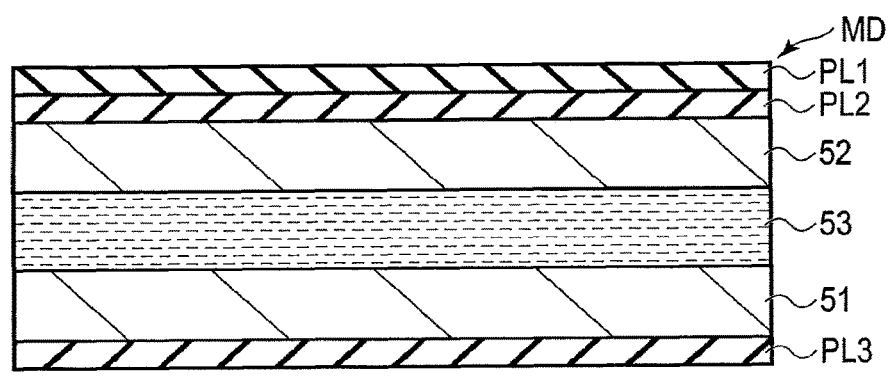
F I G. 18

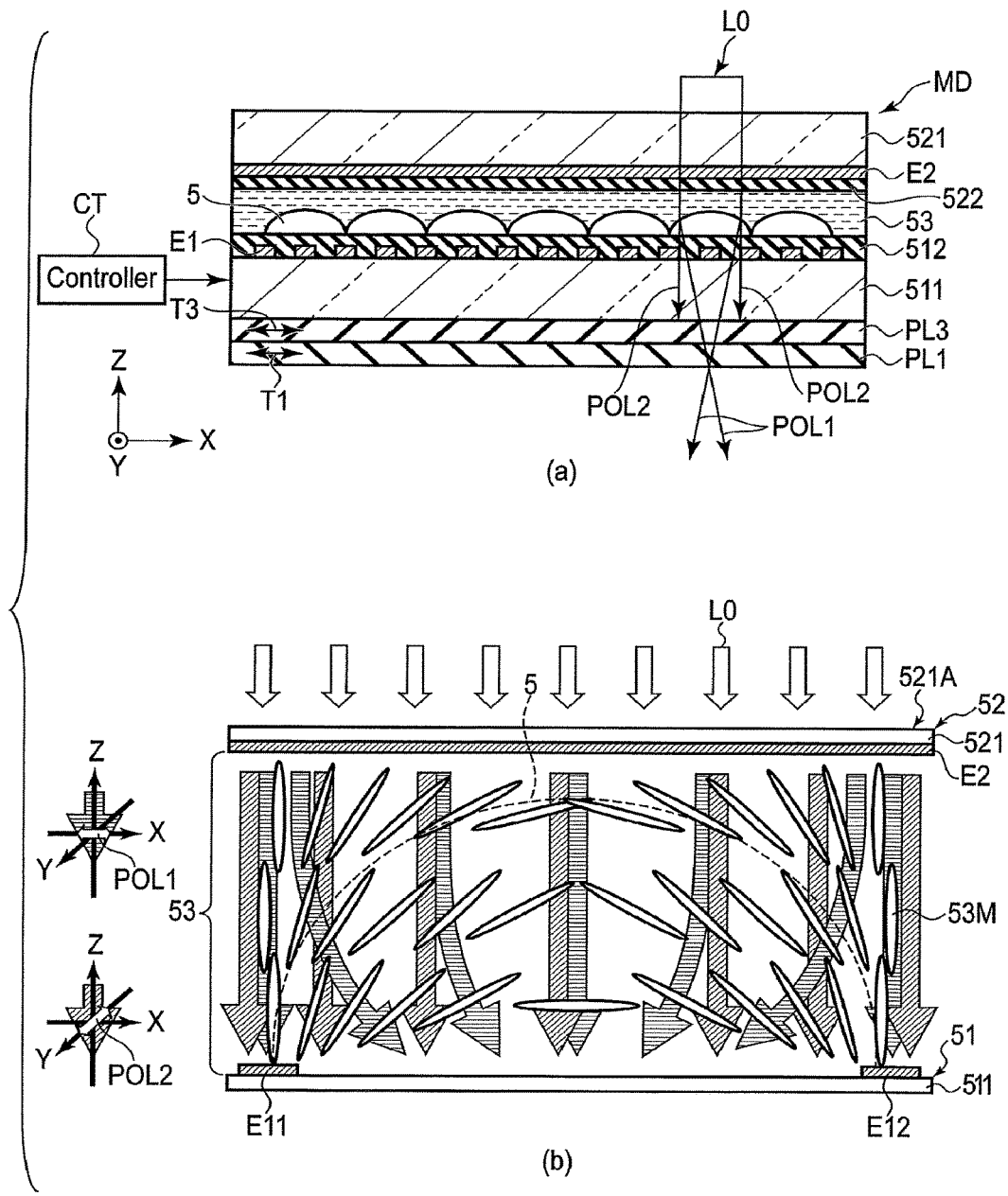
F I G. 19

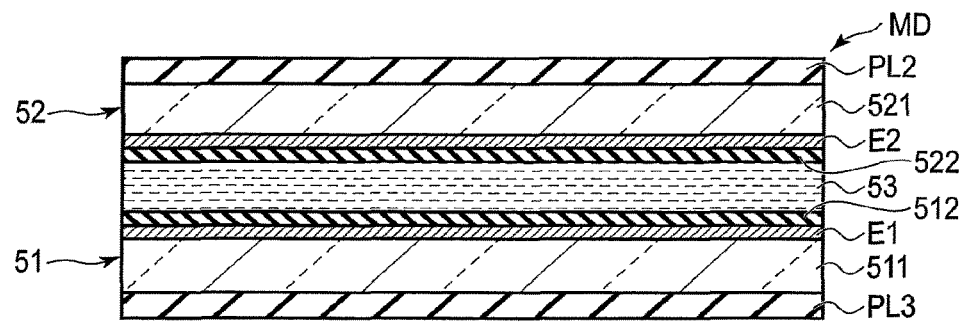
F I G. 21
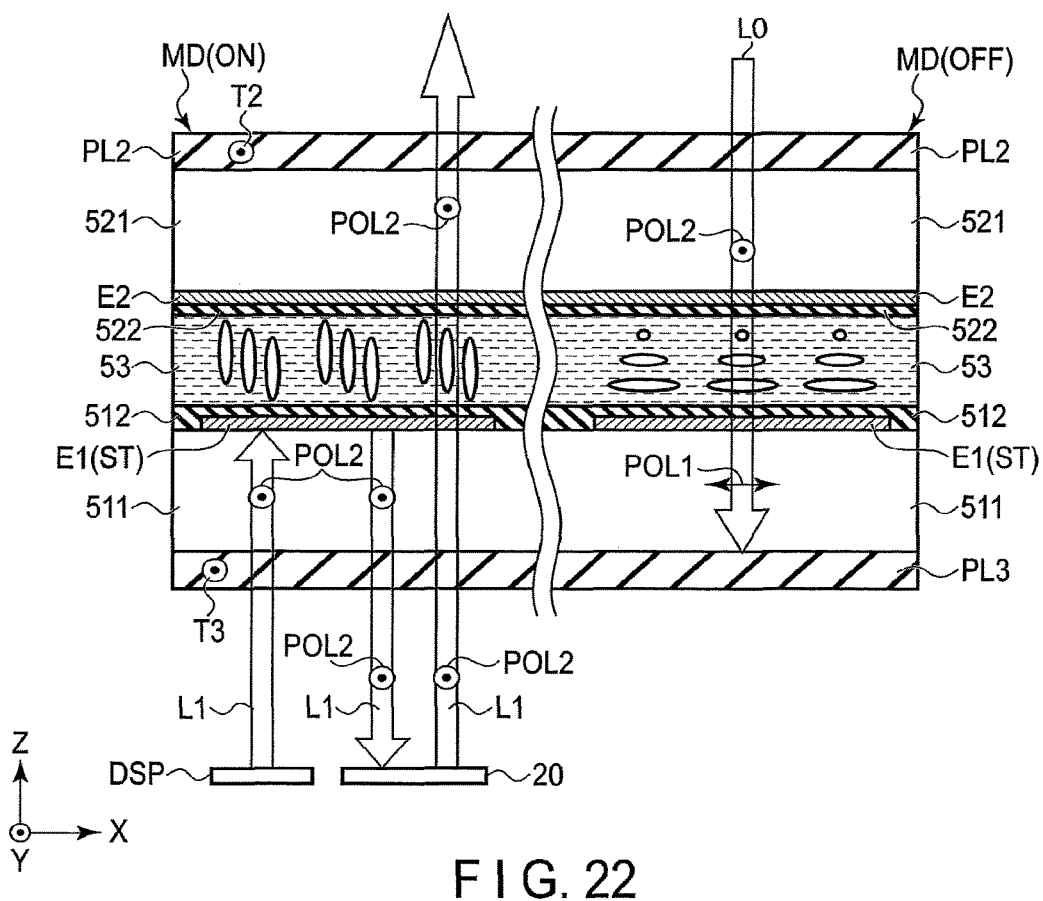
F I G. 22

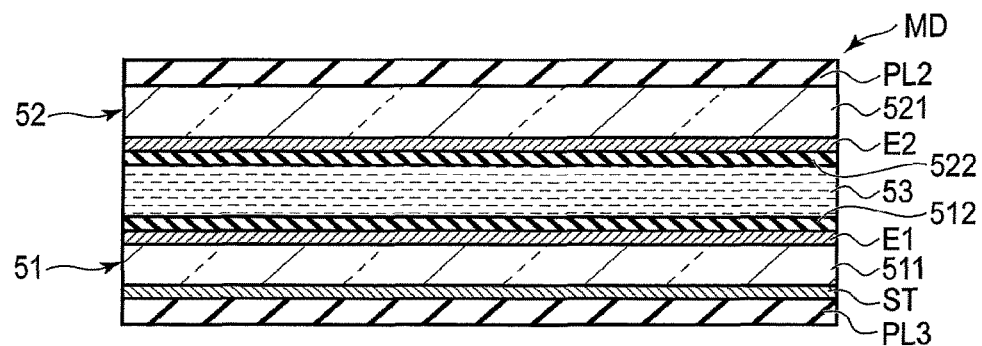
F I G. 23
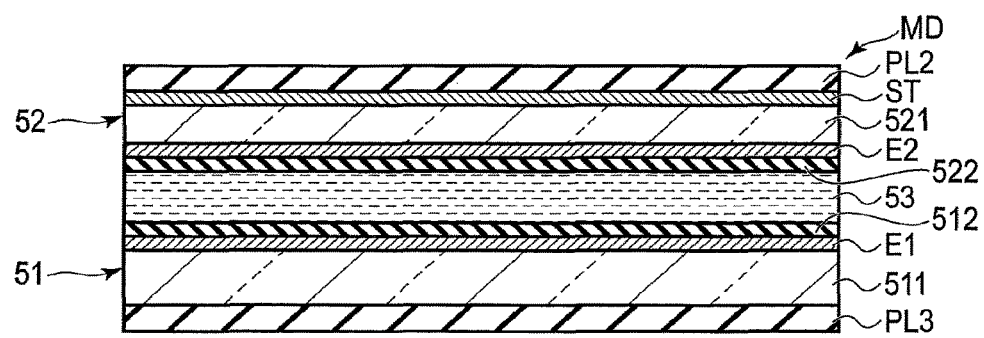
F I G. 24

DISPLAY DEVICE

CROSS-REFERENCE TO RELATED APPLICATIONS

This application is based upon and claims the benefit of priority from Japanese Patent Application No. 2017-074625, filed Apr. 4, 2017, the entire contents of which are incorporated herein by reference.

FIELD

Embodiments described herein relate generally to a display device.

BACKGROUND

For example, an imaging device comprising a polarizing filter, a retroreflective prism, and a retardation film has been proposed. With this imaging device, an aerial image representing a display image is formed at a plane-symmetrical position of an emission point of display light representing the display image with respect to the polarizing filter.

Further, an imaging optical system structured by combining a screen-cum-half mirror and a retroreflector array has been proposed. With this imaging optical system, an image projected from a projection optical system and an aerial image representing the image of an object to be observed are observed.

In various display devices as described above, in an off-state in which the aerial image is not displayed, the internal structures are visually recognized, and thus, improvement of the appearance has been desired.

BRIEF DESCRIPTION OF THE DRAWINGS

FIG. 4 is an illustration showing another configuration example of the light modulating element MD shown in FIG. 1.

FIG. 8 is an illustration for explaining yet another configuration example of the light modulating element MD.

FIG. 16 is a cross-sectional view showing a configuration example of the retroreflective element 20 applicable to the present embodiment.

FIG. 17 is an illustration for explaining yet another configuration example of the light modulating element MD.

FIG. 18 is an illustration for explaining yet another configuration example of the light modulating element MD.

FIG. 19 is an illustration for explaining yet another configuration example of the light modulating element MD.

FIG. 21 is an illustration showing a configuration example of the light modulating element MD shown in FIG. 20.

FIG. 22 is an illustration for explaining the function of the light modulating element MD shown in FIG. 21.

FIG. 23 is an illustration for explaining yet another configuration example of the light modulating element MD.

FIG. 24 is an illustration for explaining yet another configuration example of the light modulating element MD.

DETAILED DESCRIPTION

Figure 1:
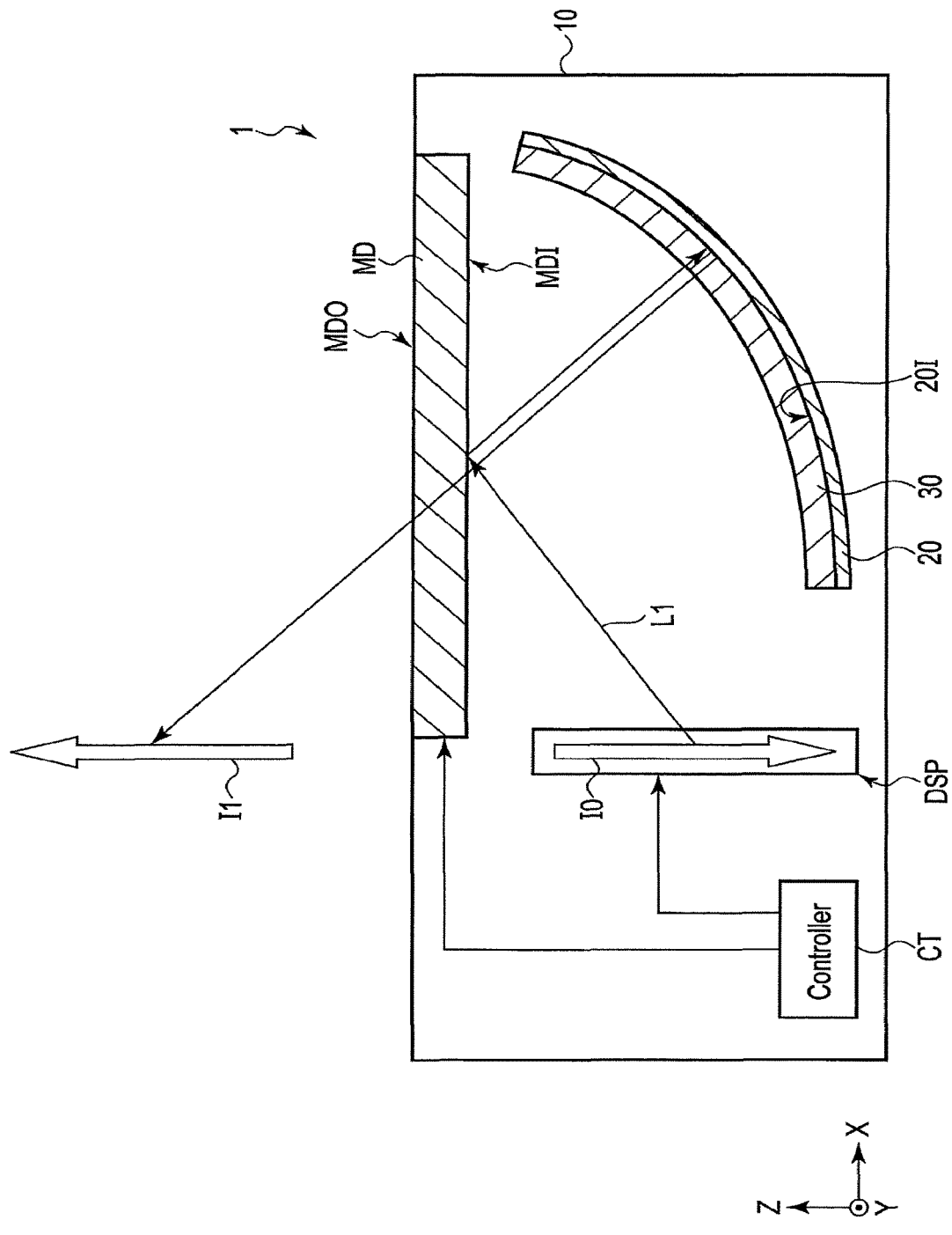
FIG. 1 is an illustration showing a configuration example of a display device 1 of the present embodiment.

In general, according to one embodiment, a display device comprises: a light modulating element which transmits or reflects incident light; a display unit which emits display light toward the light modulating element; and a retroreflective element which retroreflects the display light reflected from the light modulating element, the light modulating element including an inner surface on a side opposed to the display unit and the retroreflective element, and an outer surface on a side opposite to the inner surface, the light modulating element comprising a first mode of transmitting light incident from the outer surface at a first transmittance, and a second mode of transmitting the light incident from the outer surface at a second transmittance lower than the first transmittance.

According to another embodiment, a display device comprises: a light modulating element which transmits or reflects incident light; a display unit which emits display light toward the light modulating element; a retroreflective element which retroreflects the display light reflected from the light modulating element; and a controller which controls the light modulating element, the controller setting the light modulating element to a first transmittance state having a first transmittance at a display period when the display unit emits the display light, and setting the light modulating element to a second transmittance state having a second transmittance of which is lower than the first transmittance, at a non-display period when the display unit does not emit the display light.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing a configuration example of a display device 1 of the present embodiment. While a first direction X, a second direction Y, and a third direction Z in the drawing are orthogonal to each other, they may cross each other at an angle other than 90 degrees.

The display device 1 includes a housing 10, a retroreflective element 20, a retardation film 30, a display unit DSP, a light modulating element MD, a controller CT, etc. The housing 10 accommodates the retroreflective element 20, the retardation film 30, the display unit DSP, the light modulating element MD, etc. In one example, the housing 10 is formed of an untransparent material.

The retroreflective element 20 includes an inner surface 20I opposed to the retardation film 30. The retroreflective element 20 comprises a retroreflector which retroreflects incident light. Although details of the retroreflector will be described later, the retroreflective element 20 is constituted of a plurality of retroreflectors. The inner surface 20I forms a concave surface which is recessed as seen from the light modulating element MD.

The retardation film 30 is located between the light modulating element MD and the retroreflective element 20, and is arranged along the inner surface 20I of the retroreflective element 20. Note that the retardation film 30 may be in contact with the inner surface 20I, or separated from the inner surface 20I. The retardation film 30 is, for example, a $\lambda/4$ plate which imparts a retardation of approximately $\lambda/4$ to the transmitted light. $\lambda$ indicates a wavelength of transmitted light. Though the specifics will not be described here, the retardation film 30 is disposed such that its slow axis intersects a polarization plane of linearly polarized light at a 45 degrees angle. Note that the retardation film 30 may be a stacked layer body of retardation films having different retardation values and wavelength dispersion properties. For example, the retardation film 30 may be structured by combining a $\lambda/2$ plate and a $\lambda/4$ plate in order to reduce the wavelength dependency, for example.

The structure of the display unit DSP is not particularly limited as long as the display unit DSP can emit display light L1 which displays a display image I0. In one example, the display unit DSP comprises a liquid crystal display panel which holds a liquid crystal layer between a pair of substrates. However, the display unit DSP may be a self-luminous display panel including an organic electroluminescent element and the like, an electronic paper display panel including a cataphoretic element and the like, a display panel employing micro-electromechanical systems (MEMS), a display panel employing electrochromism, or a display panel employing electrowetting. The liquid crystal display panel may be a transmissive display panel which displays an image by selectively transmitting light from a light source device, a reflective display panel which displays an image by selectively reflecting external light or the light from the light source device, or a transflective display panel having display functions of both the transmissive type and the reflective type.

In addition, the display unit DSP may include a screen onto which light emitted from a projector is projected or a display medium (a poster or the like) illuminated by an illumination device, instead of the display panel.

The light modulating element MD includes an inner surface MDI opposed to the display unit DSP and the retardation film 30, and an outer surface MDO on a side opposite to the inner surface MDI. Each of the inner surface MDI and the outer surface MDO is parallel to an X-Y plane defined by the first direction X and the second direction Y in the example illustrated. The light modulating element MD transmits or reflects the incident light. Also, the light modulating element MD is configured to switch a state between a first transmittance state allowing transmission of light at a first transmittance and a second transmittance state having a second transmittance lower than the first transmittance.

The first transmittance state refers to a state in which the light modulating element MD has the first transmittance, and corresponds to a transparent state, for example. Note that the "transparent state" intended here is not limited to an achromatic state. The first transmittance is not limited to a specific value, and may be a transmittance within a range of allowing the interior of the housing 10 to be visually recognized through the light modulating element MD.

The second transmittance state refers to a state in which the light modulating element MD has the second transmittance, and corresponds to an untransparent state which hardly transmits light. Note that the "untransparent state" intended here is not limited to a state where the transmittance is zero. Further, in the "untransparent state", although the light modulating element MD is visually recognized as having an achromatic color such as black, white, or gray, it may be colored with a hue or a specific pattern or a logo may be displayed on the light modulating element MD. The second transmittance is not limited to a specific value, and may be a transmittance within a range of substantially preventing the interior of the housing 10 from being visually recognized through the light modulating element MD. Details of the light modulating element MD will be described later.

The controller CT controls the display unit DSP and the light modulating element MD. For example, the controller CT controls a first mode of setting the light modulating element MD to the first transmittance state at a display period when the display unit DSP emits the display light L1, and the second mode of setting the light modulating element MD to the second transmittance state at a non-display period when the display unit DSP does not emit the display light.

In the figure, I1 corresponds to an aerial image of the display image I0 displayed on the display unit DSP, and an image is formed at a plane-symmetrical position of the display image I0 with respect to the light modulating element MD. The light forming the aerial image I1 is linearly polarized light transmitted through the light modulating element MD after the light has been retroflected by the retroreflective element 20.

Although the light emitted from the display unit DSP is, for example, linearly polarized light, it may be circularly polarized light or elliptically polarized light, or natural light. The above configuration example assumes that the display light L1 emitted from the display unit DSP is, for example, the linearly polarized light or natural light. When the display light L1 emitted from the display unit DSP is the circularly polarized light or elliptically polarized light, the retardation film 30 is arranged on the inner surface MDI of the light modulating element MD, for example, instead of the above configuration example.

Figure 2:
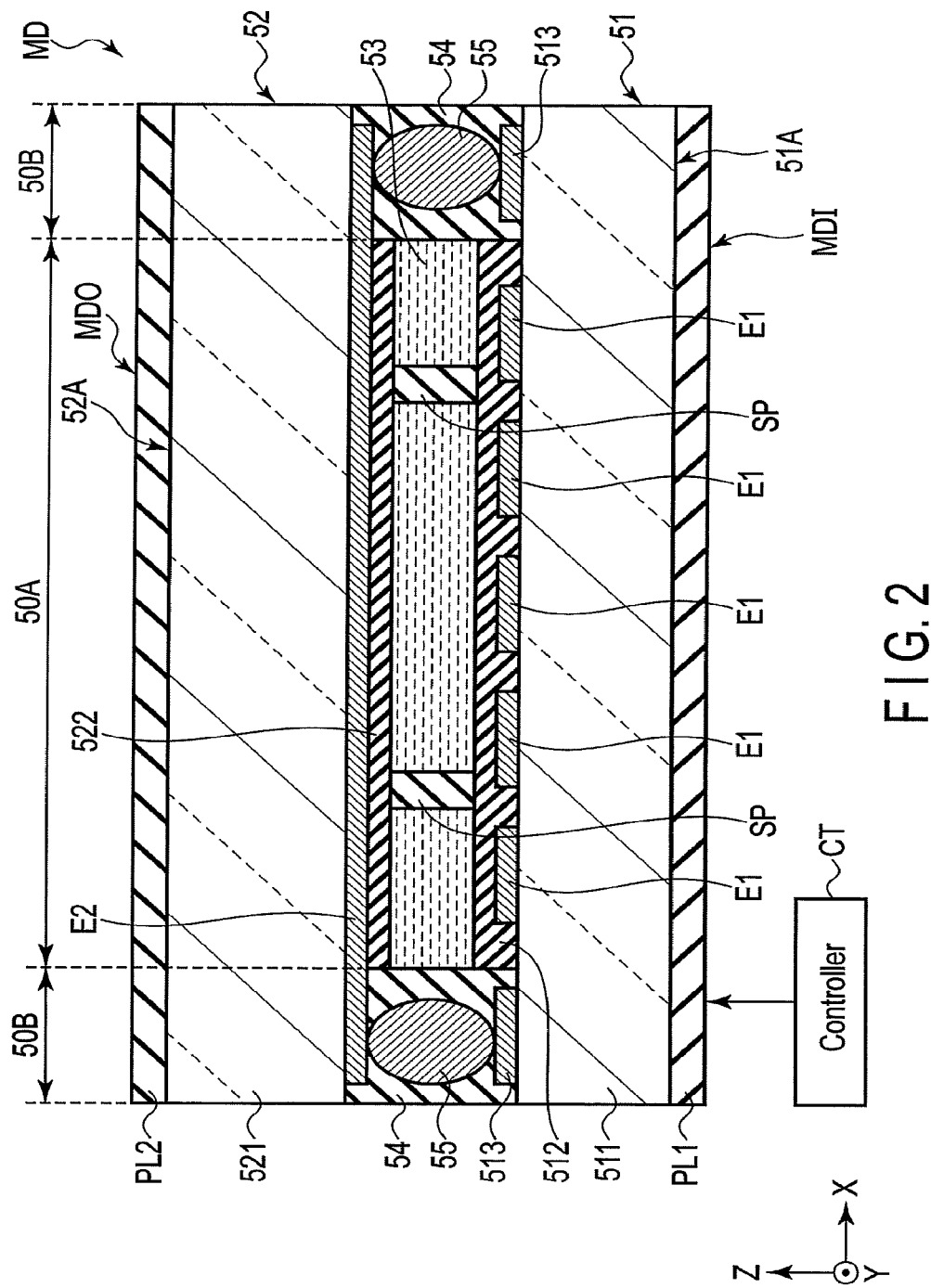
FIG. 2 is an illustration showing a configuration example of a light modulating element MD shown in FIG. 1.

FIG. 2 is an illustration showing a configuration example of the light modulating element MD shown in FIG. 1.

The light modulating element MD comprises a first substrate 51, a second substrate 52, a liquid crystal layer 53, a first control electrode E1, a second control electrode E2, a first polarizing element PL1, and a second polarizing element PL2. In the example illustrated, the first control electrode E1 is provided on the first substrate 51, and the second control electrode E2 is provided on the second substrate 52. However, the first control electrode E1 and the second control electrode E2 may both be provided on the same substrate, that is, on the first substrate 51 or the second substrate 52.

The first substrate 51 comprises a transparent insulating substrate 511, the first control electrode E1, an alignment film 512, and a feeder 513. The first control electrode E1 is located between the insulating substrate 511 and the liquid crystal layer 53. The first control electrodes E1 are arranged at intervals in the first direction X in an effective area 50A. In one example, a width of each of the first control electrodes E1 along the first direction X is greater than an interval between adjacent first control electrodes E1 along the first direction X. The alignment film 512 covers the first control electrodes E1, and is in contact with the liquid crystal layer 53. The feeder 513 is located in a non-effective area 50B outside the effective area 50A.

The second substrate 52 comprises a transparent insulating substrate 521, the second control electrode E2, and an alignment film 522. The second control electrode E2 is located between the insulating substrate 521 and the liquid crystal layer 53. The second control electrode E2 is, for example, a single plate electrode which is located on substantially the entire surface of the effective area 50A, and also extends to the non-effective area 50B. In the effective area 50A, the second control electrode E2 is opposed to the first control electrode E1 via the liquid crystal layer 53. The second control electrode E2 is opposed to the feeder 513 in the non-effective area 50B. The alignment film 522 covers the second control electrode E2, and is in contact with the liquid crystal layer 53.

Each of the insulating substrates 511 and 521 is, for example, a glass substrate or a resin substrate. Each of the first control electrode E1 and the second control electrode E2 is formed of a transparent conductive material such as indium tin oxide (ITO) or indium zinc oxide (IZO). Each of the alignment films 512 and 522 is, for example, a horizontal alignment film.

The first substrate 51 and the second substrate 52 are bonded to each other by a sealant 54 in the non-effective area 50B. A spacer SP located in the effective area 50A is interposed between the first substrate 51 and the second substrate 52, and forms a cell gap. The sealant 54 comprises a conductive material 55. The conductive material 55 is interposed between the feeder 513 and the second control electrode E2, and electrically connects the feeder 513 and the second control electrode E2.

The liquid crystal layer 53 is held between the first substrate 51 and the second substrate 52. The liquid crystal layer 53 is formed of, for example, a liquid crystal material having positive dielectric anisotropy. The first control electrode E1 and the second control electrode E2 apply a voltage for modulating the liquid crystal layer 53, or controlling the retardation of the liquid crystal layer 53. The retardation of the liquid crystal layer 53 is represented by $\Delta n \cdot d$, where $\Delta n$ is the refractive anisotropy of the liquid crystal layer 53, and d is the thickness (cell gap) of the liquid crystal layer 53 along the third direction Z.

The controller CT controls the voltage applied to the liquid crystal layer 53, or the retardation on the light transmitted through the liquid crystal layer 53. As the controller CT controls the voltage applied to each of the first control electrode E1 and the second control electrode E2, the controller CT can switch a mode between the first mode of setting the light modulating element MD to the first transmittance state and the second mode of setting the light modulating element MD to the second transmittance state.

The first polarizing element PL1 is provided on an outer surface 51A of the first substrate 51. In the example illustrated, an outer surface of the first polarizing element PL1 corresponds to the inner surface MDI of the light modulating element MD. The first polarizing element PL1 is a polarizing filter which transmits predetermined linearly polarized light. The first polarizing element PL1 is composed of, for example, a wire-grid polarizing filter, a reflective polarizing filter using a brightness enhancement film, or a multi-layered body obtained by overlapping the reflective polarizing filter and an absorptive polarizing filter. The absorptive polarizing filter transmits linearly polarized light parallel to a transmission axis, and absorbs linearly polarized light orthogonal to the transmission axis. In one example, the first polarizing element PL1 is constituted of a reflective polarizing filter which includes a transmission axis that transmits the predetermined linearly polarized light, and is configured to reflect linearly polarized light orthogonal to the transmission axis.

The second polarizing element PL2 is provided on an outer surface 52A of the second substrate 52. In the example illustrated, an outer surface of the second polarizing element PL2 corresponds to the outer surface MDO of the light modulating element MD. The second polarizing element PL2 may be a reflective polarizing filter described above or an absorptive polarizing filter. The first substrate 51, the second substrate 52, and the liquid crystal layer 53 are located between the first polarizing element PL1 and the second polarizing element PL2.

Figure 3:
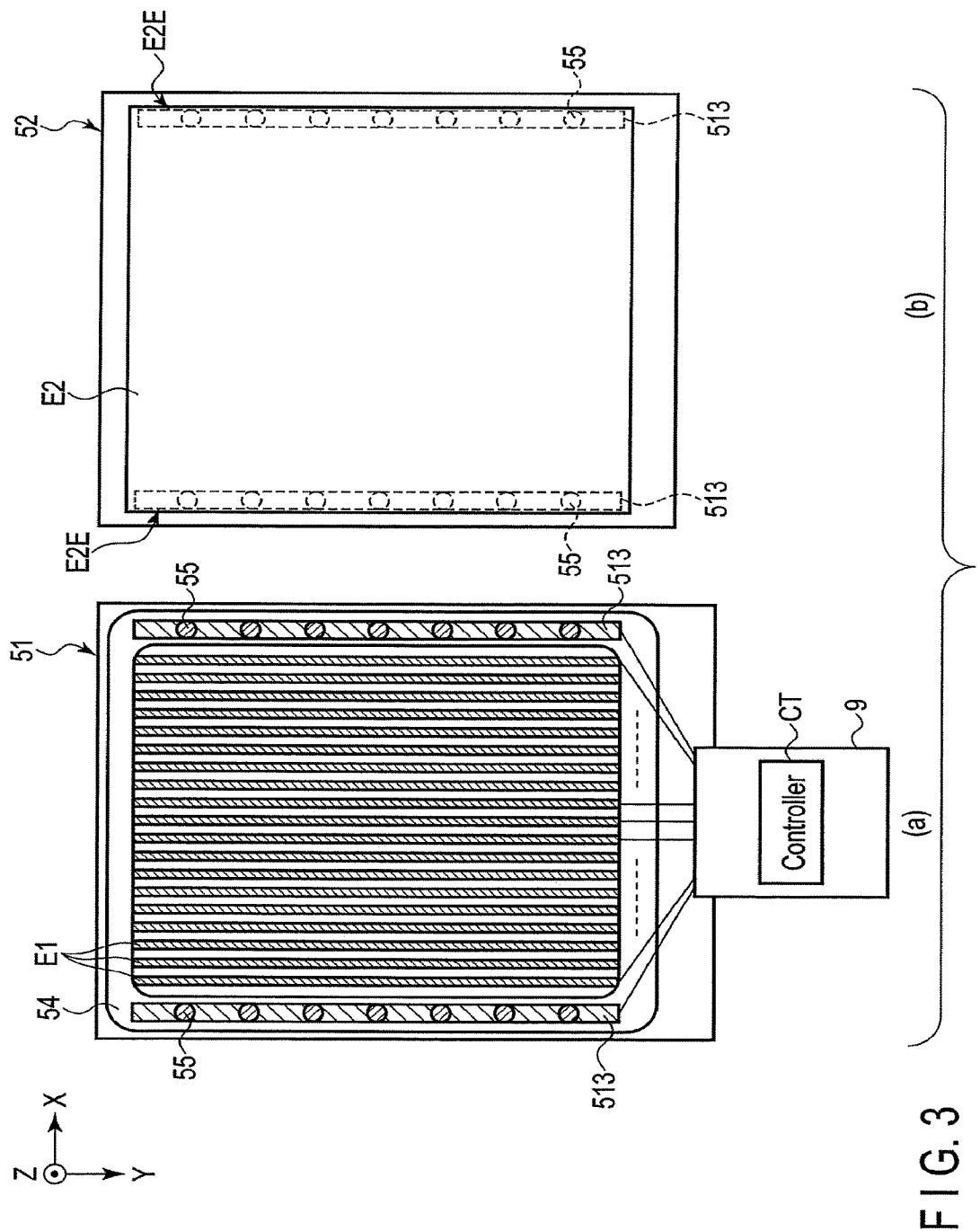
FIG. 3 is a plan view showing a configuration example of the modulation element MD.

FIG. 3 is a plan view showing a configuration example of the light modulation element MD. FIG. 3(a) is a plan view of the first substrate 51, and FIG. 3(b) is a plan view of the second substrate 52.

In the first substrate 51 shown in FIG. 3(a), the sealant 54 is formed in a frame shape. The first control electrodes E1 are located at an inner side surrounded by the sealant 54, and are arranged at intervals in the first direction X. Each of the first control electrodes E1 is, for example, a strip electrode extending in the second direction Y. Alternatively, the first control electrodes E1 may be strip electrodes extending in the first direction X, island-shaped electrodes arranged in the first direction X and the second direction Y, or a single plate electrode. The feeder 513 extends in the second direction Y at a position overlapping the sealant 54. At least a part of the conductive material 55 included in the sealant 54 overlaps the feeder 513. A wiring substrate 9 is connected to the first substrate 51, and electrically connects each of the first control electrodes E1 and the feeder 513 with the controller CT.

In the second substrate 52 shown in FIG. 3(b), the second control electrode E2 is formed rectangular, and includes an end portion E2E extending in the second direction Y. The end portion E2E overlaps the feeder 513 and the conductive material 55. That is, the second control electrode E2 is electrically connected to the controller CT via the conductive material 55 and the feeder 513.

FIG. 4 is an illustration showing another configuration example of the light modulating element MD shown in FIG. 1. The configuration example shown in FIG. 4 is different from the configuration example shown in FIG. 2 in that the first control electrode E1 is a single plate electrode. The first control electrode E1 is, for example, located on substantially the entire surface of the effective area 50A, and also extends to the non-effective area 50B. In the effective area 50A, the single first control electrode E1 and the single second control electrode E2 are opposed to each other via the liquid crystal layer 53. A voltage applied to each of the first control electrode E1 and the second control electrode E2 is controlled by the controller CT.

Figure 5:
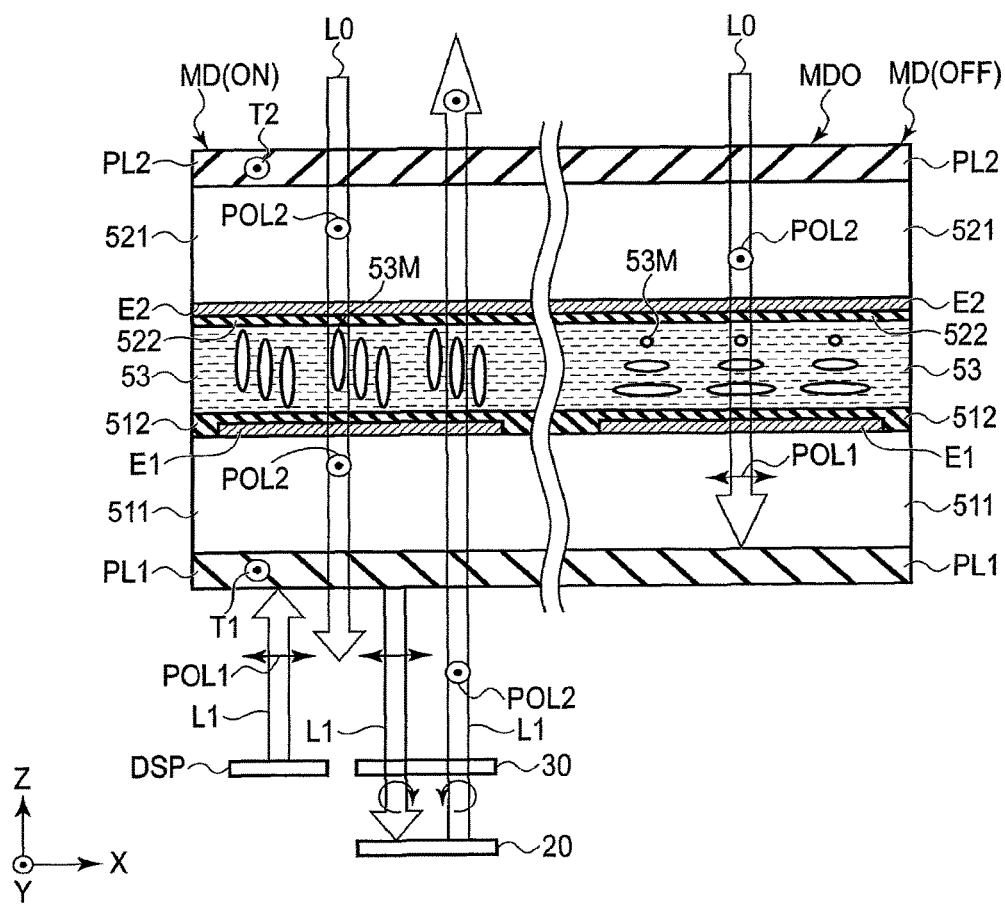
FIG. 5 is an illustration for explaining the function of the light modulating element MD.

FIG. 5 is an illustration for explaining the function of the light modulating element MD. In FIG. 5, the right part corresponds to a case where the light modulating element MD is in the off-state, and the left part corresponds to a case where the light modulating element MD is in the on-state. In the example illustrated, the alignment film 512 is subjected to alignment treatment in the first direction X, and the alignment film 522 is subjected to alignment treatment in the second direction Y. In the off-state in which no voltage is applied to the liquid crystal layer 53, liquid crystal molecules 53M included in the liquid crystal layer 53 are aligned twistedly by 90 degrees. In other words, the liquid crystal molecules 53M near the first control electrode E1 are initially aligned such that their major axes are aligned in the first direction X, and the liquid crystal molecules 53M near the second control electrode E2 are initially aligned such that their major axes are aligned in the second direction Y. In the on-state in which a voltage is applied to the liquid crystal layer 53, the liquid crystal molecules 53M are aligned such that their major axes are along an electric field produced in the liquid crystal layer 53. In other words, the liquid crystal molecules 53M are vertically aligned such that their major axes are along the third direction Z.

The first polarizing element PL1 includes a first transmission axis T1, and the second polarizing element PL2 includes a second transmission axis T2. In the example illustrated, the first transmission axis T1 and the second transmission axis T2 are both parallel to the second direction Y. Here, when a traveling direction of light is along the third direction Z, linearly polarized light having an oscillation plane along the first direction X is referred to as first linearly polarized light POL1, and linearly polarized light having an oscillation plane along the second direction Y is referred to as second linearly polarized light POL2. The first polarizing element PL1 is a reflective polarizing filter, and reflects the first linearly polarized light POL1 and transmits the second linearly polarized light POL2. The second polarizing element PL2 is an absorptive polarizing filter, for example, and absorbs the first linearly polarized light POL1 and transmits the second linearly polarized light POL2.

In the on-state, the light modulating element MD is set to the transparent state or first transmittance state (the first mode). In other words, as shown on the left side of FIG. 5, while external light L0 incident on the light modulating element MD from the outer surface MDO is natural light, only the second linearly polarized light POL2 of such light is transmitted through the second polarizing element PL2. The second linearly polarized light POL2 which is transmitted through the second polarizing element PL2 is hardly affected by the liquid crystal molecules 53M that are vertically aligned. Thus, the above second linearly polarized light POL2 passes through the liquid crystal layer 53 while maintaining its polarization plane. The second linearly polarized light POL2 transmitted through the liquid crystal layer 53 passes through the first polarizing element PL1. Accordingly, the light modulating element MD becomes transparent, and the display unit DSP, the retroreflective element 20, the retardation film 30, and the like can be visually recognized from the outside through the light modulating element MD.

Figure 6:
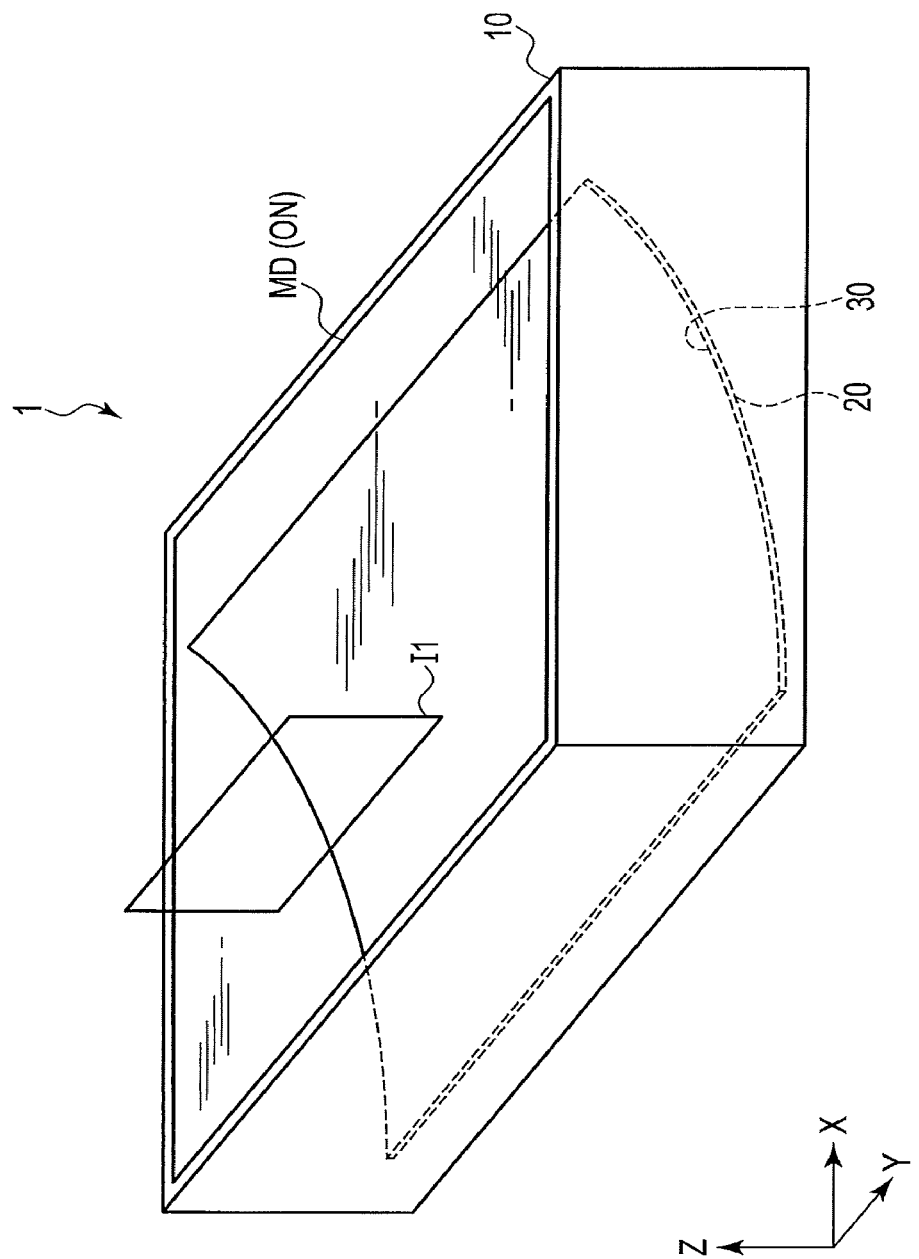
FIG. 6 is a perspective view showing the display device 1 when the light modulating element MD is in the on-state.

In such an on-state, the display unit DSP emits the first linearly polarized light POL1 corresponding to the display light L1. The display light L1 is reflected by the first polarizing element PL1 while being maintained as the first linearly polarized light POL1, is transmitted through the retardation film 30, and is converted into circularly polarized light. The display light L1, which is the circularly polarized light, is retroreflected by the retroreflective element 20, is transmitted through the retardation film 30 again, and is converted into the second linearly polarized light POL2. The second linearly polarized light POL2 is transmitted through the first polarizing element PL1, and passes through the liquid crystal layer 53 while maintaining its polarization plane because it is hardly affected by the vertically aligned liquid crystal molecules 53M. The second linearly polarized light POL2 transmitted through the liquid crystal layer 53 passes through the second polarizing element PL2. Further, the display light L1 forms an image as the aerial image. An observer can observe the second linearly polarized light POL2 transmitted through the light modulating element MD in the transparent state as the aerial image I1 floating in air, as shown in FIG. 6.

Figure 7:
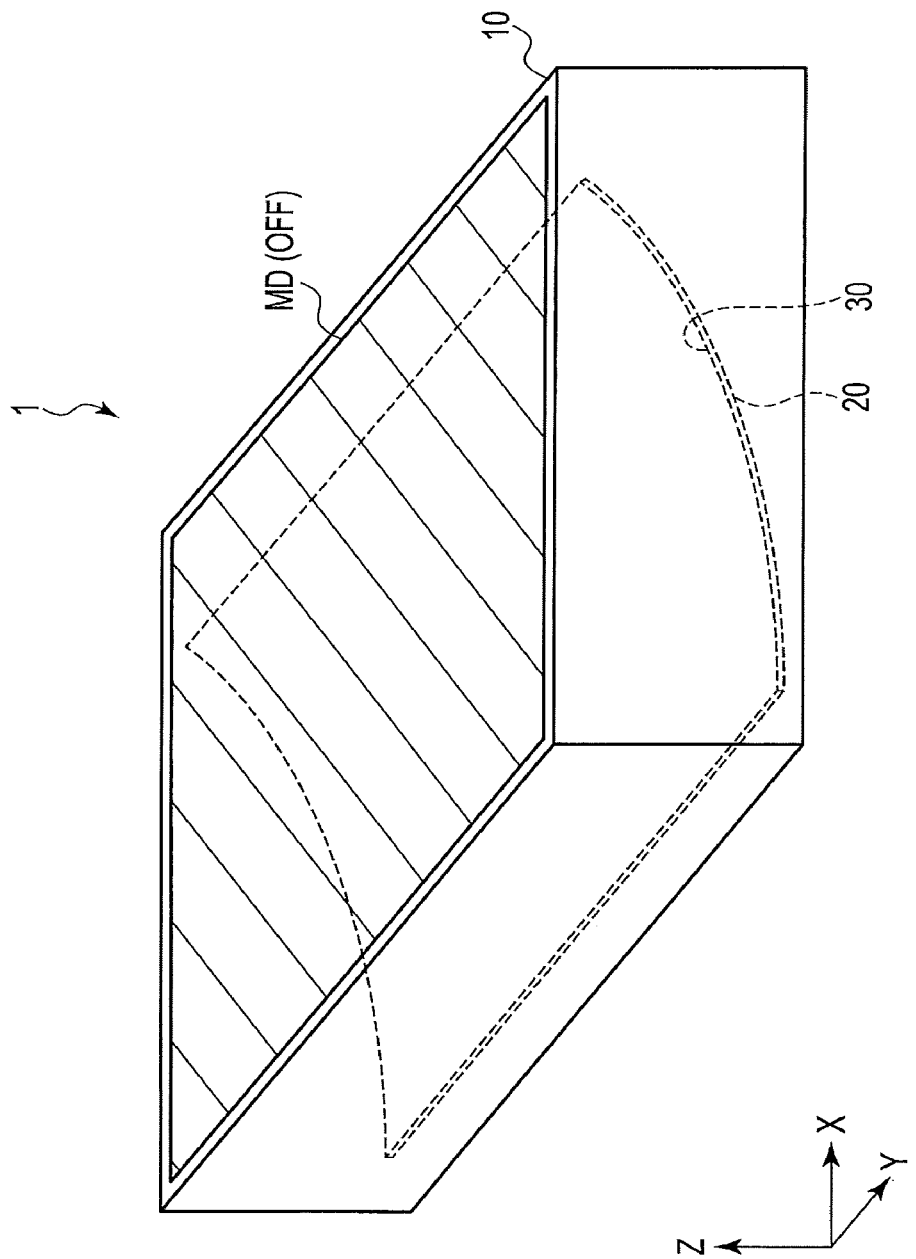
FIG. 7 is a perspective view showing the display device 1 when the light modulating element MD is in the off-state.

Meanwhile, in the off-state, the light modulating element MD is set to the untransparent state or second transmittance state (the second mode). More specifically, as shown on the right side of FIG. 5, of the external light L0 incident on the light modulating element MD from the outer surface MDO, the second linearly polarized light POL2 transmitted through the second polarizing element PL2 is affected by the twistedly aligned liquid crystal molecules 53M and its polarization plane is rotated. Thus, the second linearly polarized light POL2 is converted into the first linearly polarized light POL1 after being transmitted through the liquid crystal layer 53. The converted first linearly polarized light POL1 does not pass through the first polarizing element PL1. Accordingly, the light modulating element MD becomes untransparent. Accordingly, when the untransparent light modulating element MD is observed, the observer cannot visually recognize the display unit DSP, the retroreflective element 20, the retardation film 30, and the like, from the outside through the light modulating element MD, as shown in FIG. 7. Note that in such an off-state, the display unit DSP does not emit the display light.

Further, as described above, according to the present embodiment, by setting the light modulating element MD to the first transmittance state (transparent state) at the display period when the display unit DSP emits the display light, the display image I0 of the display unit DSP can be observed as the aerial image I1. Further, by setting the light modulating element MD to the second transmittance state (untransparent state) at the non-display period when the display unit DSP does not emit the display light, the internal structures of the display device 1 is made hard to be virtually recognized. Accordingly, a neat and simple looking display device 1 can be provided.

Also, in the present embodiment, the light modulating element MD is structured to realize the so-called normally-black mode in which the off-state in which no voltage is applied to the liquid crystal layer 53 corresponds to the second transmittance state (untransparent state). Accordingly, a voltage for maintaining the second transmittance state is not required, and power consumption can be suppressed. Note that in a configuration example described with reference to FIG. 5, in order to realize the normally-black mode, the liquid crystal layer 53 has twist alignment in the off-state, and the first transmission axis T1 of the first polarizing element PL1 is set parallel to the second transmission axis T2 of the second polarizing element PL2.

However, also in the other configuration examples which will be described below, the normally-black mode can be realized.

FIG. 8 is an illustration for explaining yet another configuration example of the light modulating element MD. In the light modulating element MD which has been illustrated, in the on-state in which a voltage is applied to the liquid crystal layer 53, the retardation Δn·d of the liquid crystal layer 53 is substantially zero, and in the off-state in which no voltage is applied to the liquid crystal layer 53, the retardation Δn·d of the liquid crystal layer 53 is substantially λ/2. In such a configuration example, the first transmission axis T1 and the second transmission axis T2 are set parallel to each other, and in the example illustrated, the first transmission axis T1 and the second transmission axis T2 are parallel to the second direction Y.

In the off-state, of the external light L0, the second linearly polarized light POL2 transmitted through the second polarizing element PL2 is subjected to the retardation of λ/2 when transmitted through the liquid crystal layer 53, and is converted into the first linearly polarized light POL1. Accordingly, the first linearly polarized light POL1 transmitted through the liquid crystal layer 53 cannot pass through the first polarizing element PL1 (untransparent state).

In the on-state, after the first linearly polarized light POL1, which is the display light L1, has been reflected by the first polarizing element PL1, the first linearly polarized light POL1 is converted into the second linearly polarized light POL2 as a result of the retardation of λ/2 applied since the first linearly polarized light POL1 is transmitted through the retardation film 30, which is the λ/4 plate, twice, when first linearly polarized light POL1 is retroreflected by the retroreflective element 20. The second linearly polarized light POL2 is transmitted through the first polarizing element PL1, and passes through the liquid crystal layer 53 in the on-state. In the on-state, the second linearly polarized light POL2 is hardly affected by the retardation when transmitted through the liquid crystal layer 53. Accordingly, the second linearly polarized light POL2 transmitted through the liquid crystal layer 53 passes through the second polarizing element PL2, and contributes to display.

Figure 9:
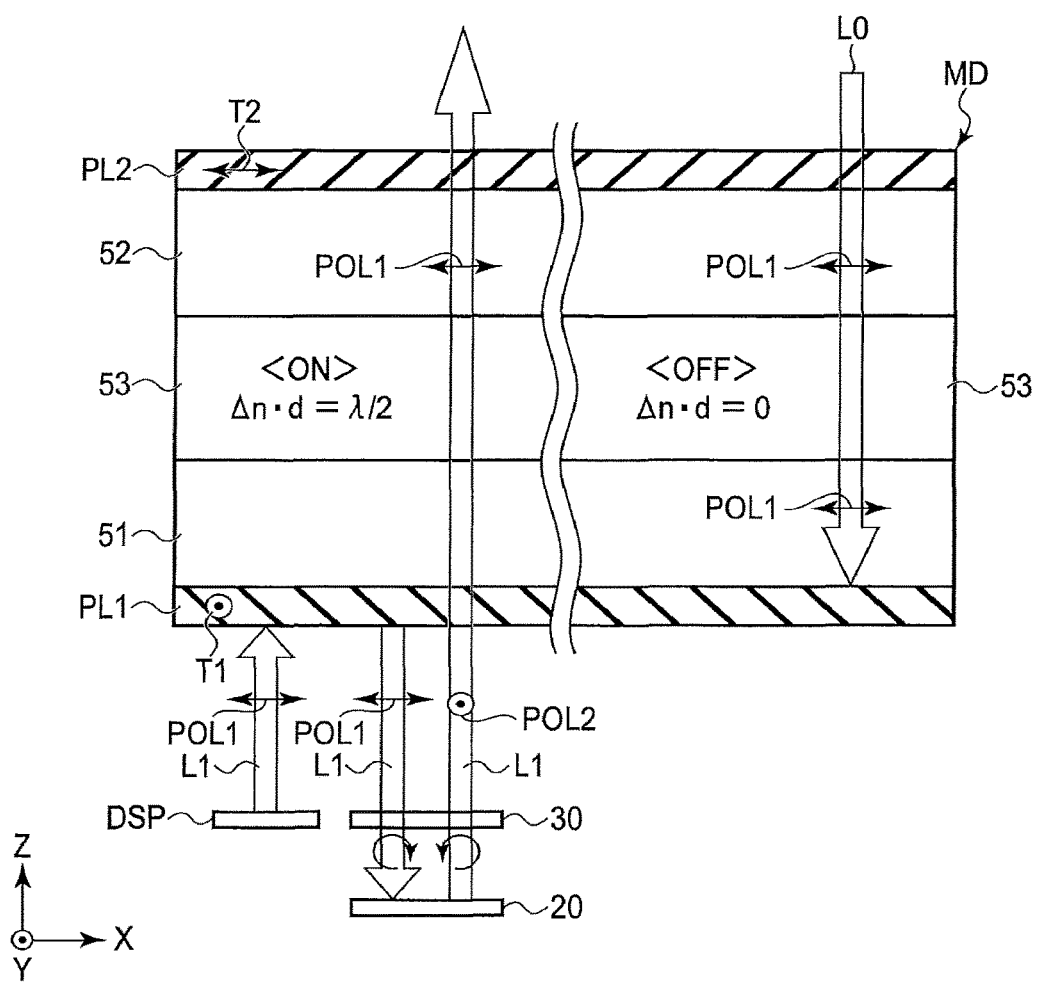
FIG. 9 is an illustration for explaining yet another configuration example of the light modulating element MD.

FIG. 9 is an illustration for explaining yet another configuration example of the light modulating element MD. In the light modulating element MD which has been illustrated, in the on-state in which a voltage is applied to the liquid crystal layer 53, the retardation Δn·d of the liquid crystal layer 53 is substantially λ/2, and in the off-state in which no voltage is applied to the liquid crystal layer 53, the retardation Δn·d of the liquid crystal layer 53 is substantially zero. In such a configuration example, the first transmission axis T1 and the second transmission axis T2 are set to cross each other, and in the example illustrated, the first transmission axis T1 is parallel to the second direction Y, and the second transmission axis T2 is parallel to the first direction X.

In the off-state, of the external light L0, the first linearly polarized light POL1 transmitted through the second polarizing element PL2 is hardly affected by the retardation when transmitted through the liquid crystal layer 53. Accordingly, the first linearly polarized light POL1 transmitted through the liquid crystal layer 53 cannot pass through the first polarizing element PL1 (untransparent state).

In the on-state, the second linearly polarized light POL2 transmitted through the first polarizing element PL1 is subjected to the retardation of λ/2 when transmitted through the liquid crystal layer 53 in the on-state, and is converted into the first linearly polarized light POL1. Accordingly, the first linearly polarized light POL1 transmitted through the liquid crystal layer 53 passes through the second polarizing element PL2, and contributes to display.

Note that the light modulating element MD of the present embodiment may be structured to realize the so-called normally-white mode in which the off-state in which no voltage is applied to the liquid crystal layer 53 corresponds to the first transmittance state (transparent state).

Further, the light modulating element MD may have a structure comprising a polymer-dispersed liquid crystal capable of switching the state between the untransparent state of diffusing the incident light and the transparent state of allowing transmission of the incident light. Alternatively, the light modulating element MD may have a structure comprising an organic electroluminescent element capable of switching the state between an emitting state (untransparent state) and a non-emitting state (transparent state). Alternatively, the light modulating element MD may have an electrochromic structure or a structure employing electrowetting capable of switching the state between a colored state (untransparent state) and an uncolored state (transparent state).

Next, a specific example of each of the structures will be described.

Figure 10:
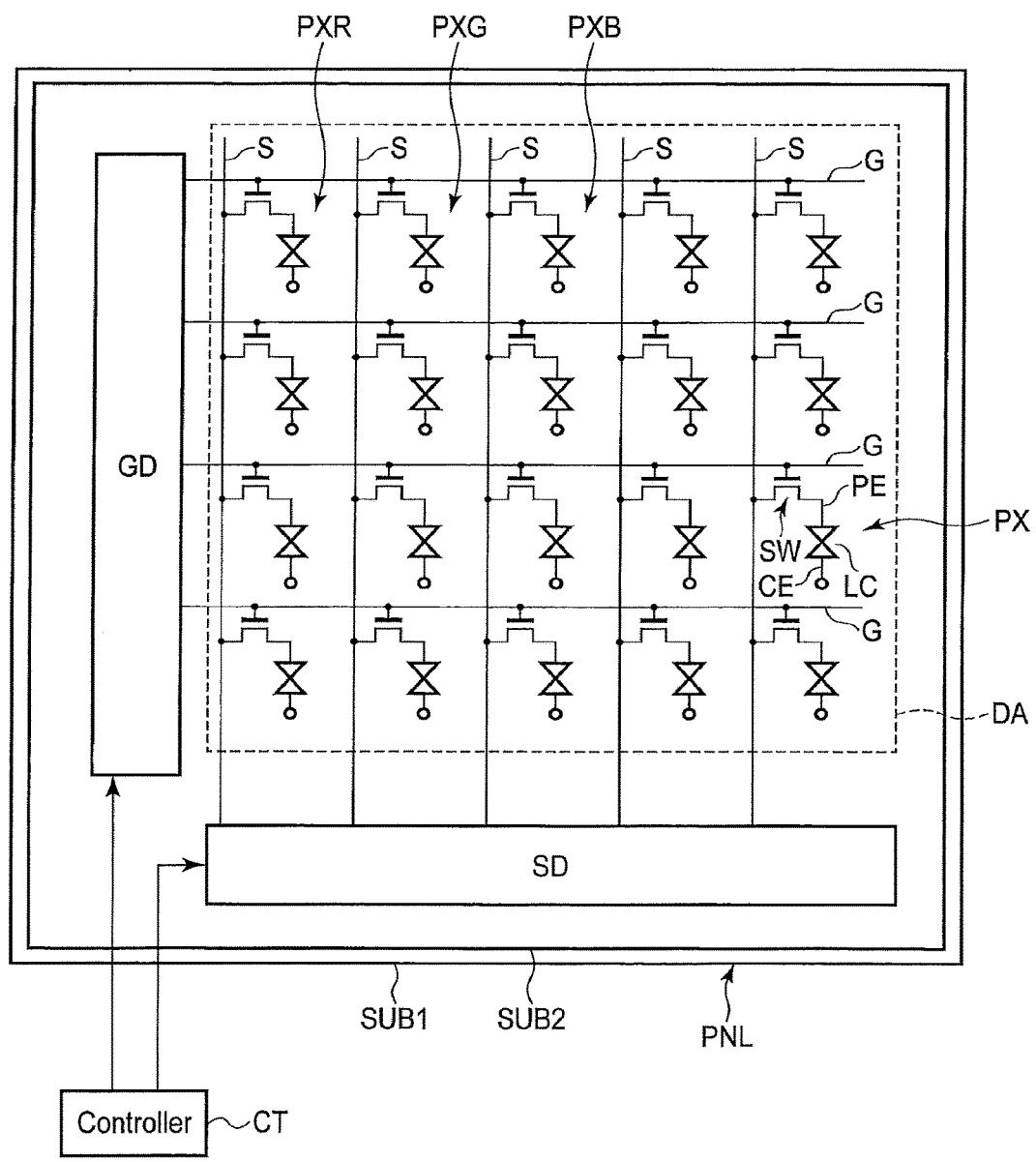
FIG. 10 is an illustration showing a configuration example of a display panel PNL which constitutes a display unit DSP shown in FIG. 1.

FIG. 10 is an illustration showing a configuration example of a display panel PNL which constitutes the display unit DSP shown in FIG. 1. An active-matrix-driving transmissive liquid crystal display panel will be described as an example of the display panel PNL. More specifically, the display panel PNL includes a first substrate SUB1, a second substrate SUB2 opposed to the first substrate SUB1, and a liquid crystal layer LC held between the first substrate SUB1 and the second substrate SUB2. The first substrate SUB1 and the second substrate SUB2 are bonded to each other with a predetermined cell gap formed between the substrates. The display panel PNL includes a display area DA where an image is displayed. The display area DA includes sub-pixels PX arrayed in a matrix.

The display area DA includes, for example, a red pixel PXR which displays red, a green pixel PXG which displays green, and a blue pixel PXB which displays blue, as the sub-pixels PX. Note that the display area DA may further include a sub-pixel of a color different from red, green and blue (for example, a white pixel which displays white). A main pixel for realizing color display is constituted of the sub-pixels PX of different colors as described above. That is, the main pixel is the minimum unit which constitutes a color image. In the example illustrated, the main pixel is constituted of the red pixel PXR, the green pixel PXG, and the blue pixel PXB.

The first substrate SUB1 comprises scanning lines G and signal lines S crossing the scanning lines G. Each of the scanning lines G is drawn outside the display area DA, and is connected to a scanning line driver GD. Each of the signal lines S is drawn outside the display area DA, and is connected to a signal line driver SD. The scanning line driver GD and the signal line driver SD are connected to the controller CT. The controller CT generates a control signal based on an image signal, and controls the scanning line driver GD and the signal line driver SD.

Each of the sub-pixels PX includes a switching element SW, a pixel electrode PE, a common electrode CE, and the like. The switching element SW is electrically connected to the scanning line G and the signal line S. The switching element SW is composed of, for example, a thin-film transistor. The pixel electrode PE is electrically connected to the switching element SW. The common electrode CE is opposed to each of a plurality of pixel electrodes PE.

Although the detailed configuration of the display panel PNL will not be described here, in a display mode using a longitudinal electric field formed along the normal of the substrate main surface or a display mode using an inclined electric field which is tilted obliquely with respect to the normal of the substrate main surface, the pixel electrode PE is disposed in the first substrate SUB1 while the common electrode CE is disposed in the second substrate SUB2. Further, in a display mode using a lateral electric field formed along the substrate main surface, both the pixel electrode PE and the common electrode CE are provided in the first substrate SUB1. Furthermore, the display panel PNL may have a structure corresponding to a display mode using an arbitrary combination of the longitudinal, lateral, and inclined electric fields.

Figure 11:
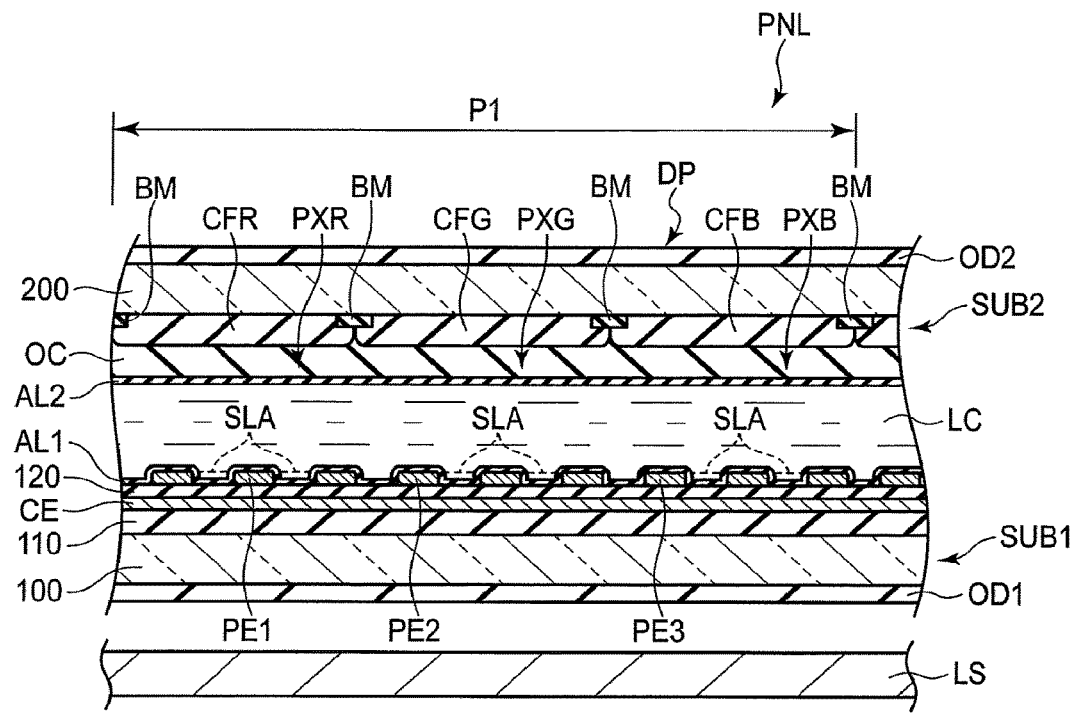
FIG. 11 is a cross-sectional view showing a configuration example of the display panel PNL shown in FIG. 10.

FIG. 11 is a cross-sectional view showing a configuration example of the display panel PNL shown in FIG. 10. A cross-sectional structure of the display panel PNL adopting a fringe field switching (FFS) mode which is one of the display modes using the lateral electric field will be explained briefly.

The first substrate SUB1 includes a first insulating substrate 100, a first insulating film 110, the common electrode CE, a second insulating film 120, pixel electrodes PE1 to PE3, a first alignment film AL1, etc. The common electrode CE extends over the red pixel PXR, the green pixel PXG, and the blue pixel PXB. Each of the pixel electrode PE1 of the red pixel PXR, the pixel electrode PE2 of the green pixel PXG, and the pixel electrode PE3 of the blue pixel PXB is opposed to the common electrode CE, and includes slits SLA. In the example illustrated, the common electrode CE is located between the first insulating film 110 and the second insulating film 120, and the pixel electrodes PE1 to PE3 are located between the second insulating film 120 and the first alignment film AL1. Alternatively, the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The second substrate SUB2 includes a second insulating substrate 200, a light-shielding layer BM, color filters CFR, CFG and CFB, an overcoat layer OC, a second alignment film AL2, etc. The color filters CFR, CFG, and CFB are opposed to the pixel electrodes PE1 to PE3, respectively, with the liquid crystal layer LC interposed therebetween. The color filter CFR is a red color filter arranged in the red pixel PXR, the color filter CFG is a green color filter arranged in the green pixel PXG, and the color filter CFB is a blue color filter arranged in the blue pixel PXB. Note that, although the color filters CFR, CFG and CFB are formed in the second substrate SUB2 in the example illustrated, they may be formed in the first substrate SUB1.

The liquid crystal layer LC is sealed between the first alignment film AL1 and the second alignment film AL2.

A light source device LS is opposed to the first substrate SUB1. Various types of devices are applicable as the light source device LS, but explanations of the detailed structure will be omitted. A first optical element OD1 including a polarizer is disposed on an outer surface of the first insulating substrate 100. A second optical element OD2 including a polarizer is disposed on an outer surface of the second insulating substrate 200. In the example illustrated, a surface of the second optical element OD2 corresponds to a display surface DP of the display panel PNL. The second optical element OD2 is configured to emit the display light L1 corresponding to the first linearly polarized light POL1.

The main pixels each composed of the red pixel PXR, the green pixel PXG, and the blue pixel PXB are arrayed at a pitch P1.

Figure 12:
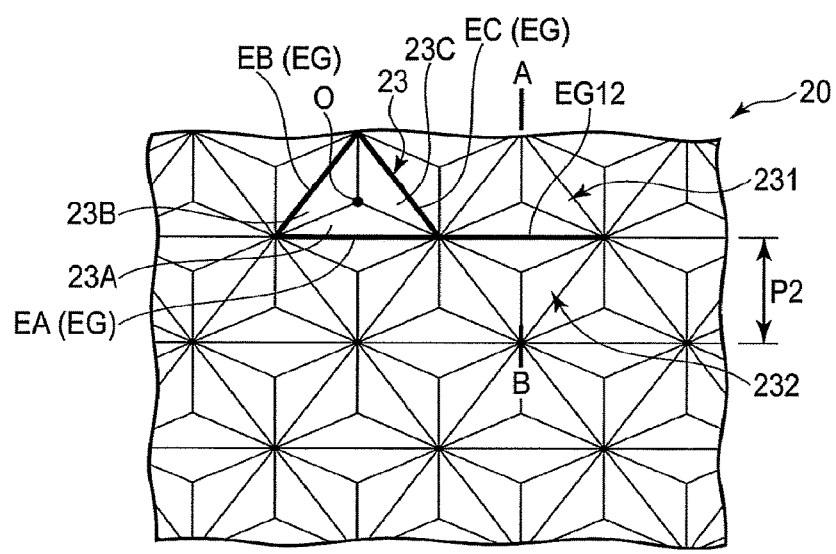
FIG. 12 is a plan view showing a configuration example of a retroreflective element 20 shown in FIG. 1.

FIG. 12 is a plan view showing a configuration example of the retroreflective element 20 shown in FIG. 1.

The retroreflective element 20 is composed of a plurality of retroreflectors 23. In a plan view illustrated, each of the retroreflectors 23 includes an edge EG shaped in a regular triangle. The edge EG includes a side EA, a side EB, and a side EC. In one example, the retroreflector 23 includes three reflective surfaces 23A, 23B, and 23C which are orthogonal to each other. The sides EA, EB, and EC are included in the reflective surfaces 23A, 23B, and 23C, respectively. A point of intersection of the three reflective surfaces 23A, 23B, and 23C corresponds to the center O of the retroreflector 23. In one example, in the retroreflector 23, the center O is recessed toward the back of the plane of the drawing. When the retroreflector 23 includes a recess portion surrounded by the three reflective surfaces 23A, 23B, and 23C, the edge EG corresponds to a top portion of the retroreflector 23, and the center O corresponds to a bottom portion of the retroreflector 23. Alternatively, the retroreflector 23 may include a protruding portion surrounded by the three reflective surfaces 23A, 23B, and 23C. In this case, the edge EG corresponds to the bottom portion of the retroreflector 23, and the center O corresponds to the top portion of the retroreflector 23.

Such retroreflectors 23 are arrayed at a pitch P2. However, the retroreflectors 23 adjacent to each other have shapes inverted relative to each other by 180 degrees. A retroreflector 231 and a retroreflector 232 in the drawing are adjacent to each other, and are positioned to be axisymmetrical with respect to an edge E12.

The resolution of the aerial image I1 depends on the pitch P2 of the retroreflector 23. In order to suppress deterioration in the resolution, the pitch P2 should preferably be smaller than the pitch P1 of the pixel in the display panel PNL shown in FIG. 11.

Figure 13:
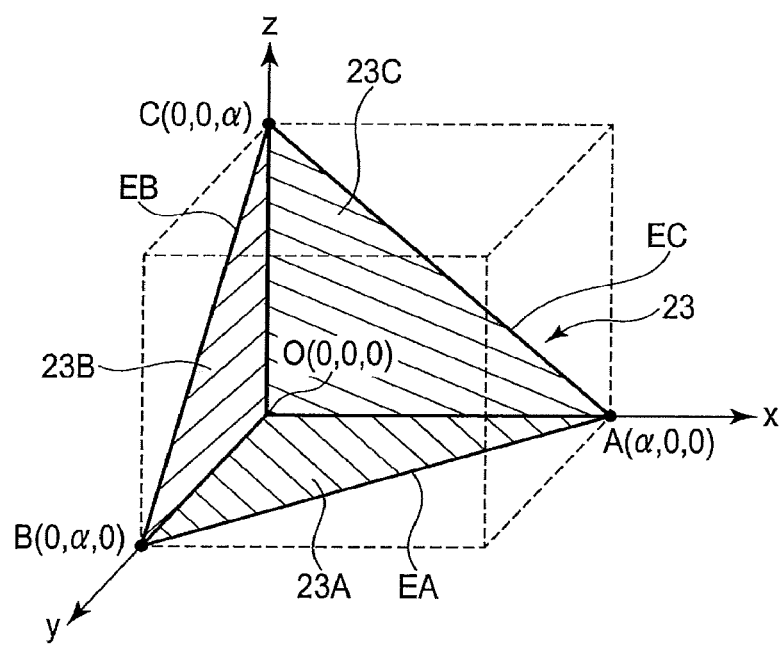
FIG. 13 is a perspective view showing a configuration example of a retroreflector 23 shown in FIG. 12.

FIG. 13 is a perspective view showing a configuration example of the retroreflector 23 shown in FIG. 12. The shape of the retroreflector 23 will be explained by using an xyz-coordinate system in which the x-, y-, and z-axes orthogonal to each other.

The retroreflector 23 includes three reflective surfaces 23A, 23B, and 23C in the xyz-coordinate system. The reflective surfaces 23A to 23C all have the same shape, and are shaped in a right-angled isosceles triangle. Further, the reflective surfaces 23A to 23C are orthogonal to each other. The retroreflector 23 having the reflective surfaces 23A to 23C of such a shape is called, for example, a corner cube or a corner reflector.

When it is assumed that point A on the x-axis is ($\alpha$, 0, 0), point B on the y-axis is (0, $\alpha$, 0), and point C on the z-axis is (0, 0, $\alpha$), the reflective surface 23A is formed on the x-y plane and is defined by the origin O, point A, and point B. The reflective surface 23B is formed on the y-z plane and is defined by the origin O, point B, and point C. The reflective surface 23C is formed on the x-z plane and is defined by the origin O, point A, and point C. A line segment which connects points A and B, a line segment which connects points B and C, and a line segment which connects points A and C correspond to the sides EA, EB, and EC of the edge EG shown in FIG. 12, respectively. Note that the origin O corresponds to the center O shown in FIG. 12.

When the origin O corresponds to the bottom portion of the retroreflector 23, a plane defined by the three points A, B, and C does not exist. In other words, the inner part surrounded by the three reflective surfaces 23A to 23C is an air layer. When the origin O corresponds to the top portion of the retroreflector 23, a plane defined by the three points A, B, and C exists. In other words, the retroreflector 23 becomes a regular tetrahedron.

In the retroreflector 23, since the incident light is reflected by each of the three reflective surfaces 23A to 23C, retroreflection in which the light is reflected back in substantially the same optical path as that of the incident light is realized. Note that the shape of the retroreflector 23 is not limited to the example illustrated in the drawing.

Figure 14:
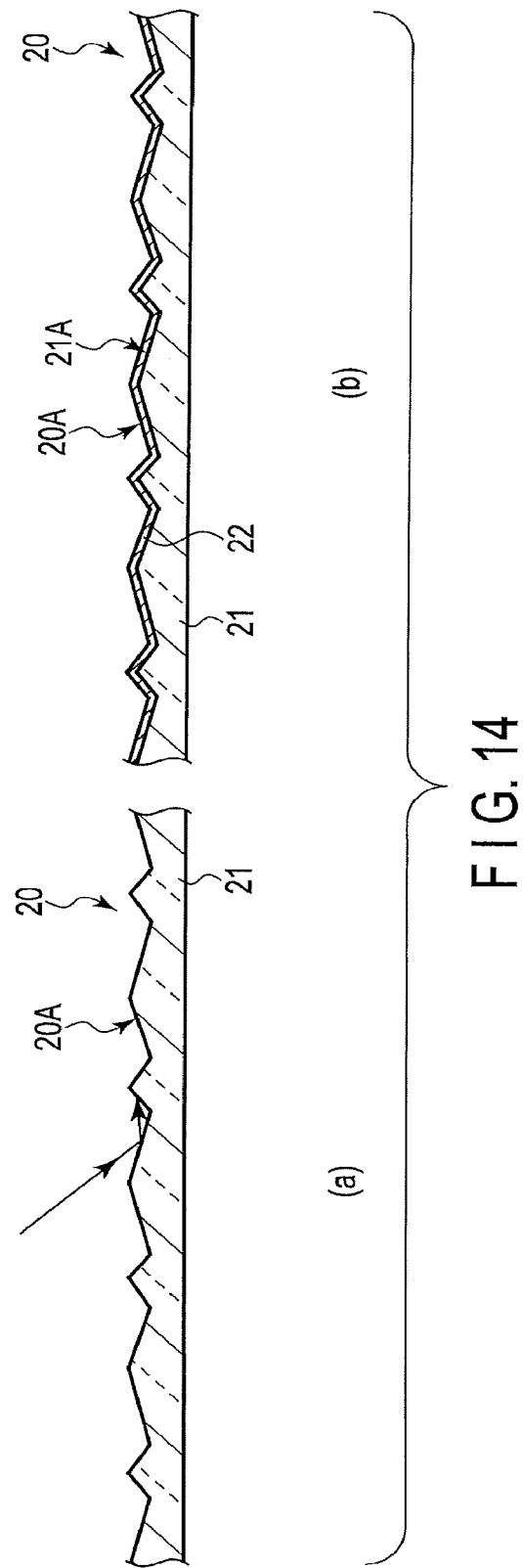
FIG. 14 is a cross-sectional view showing a configuration example of the retroreflective element 20 applicable to the present embodiment.
Figure 15:
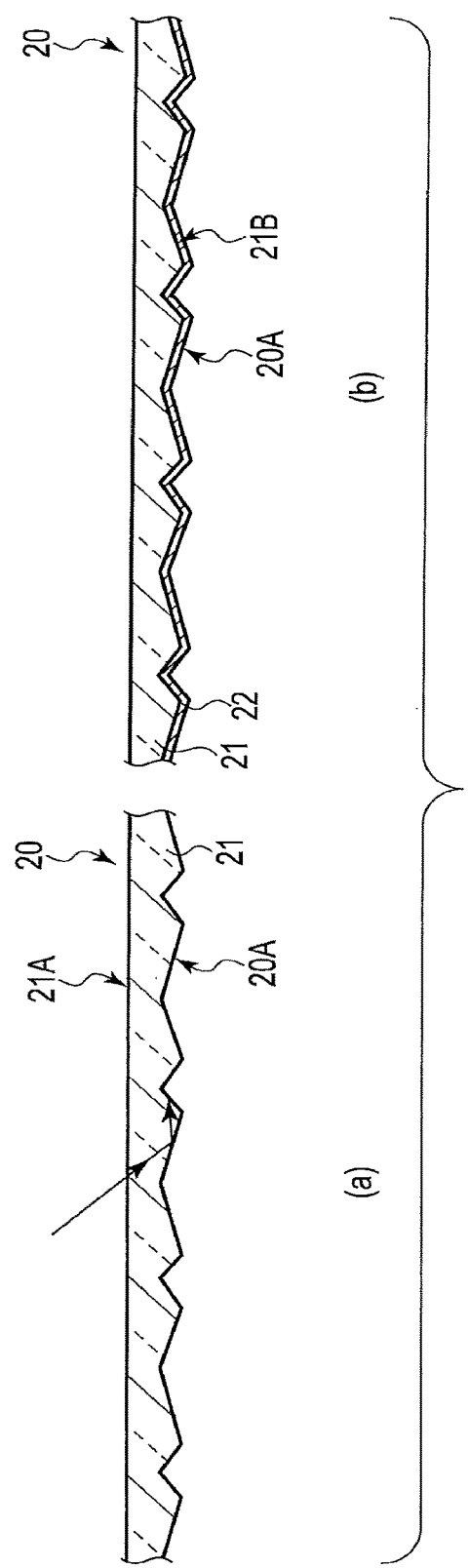
FIG. 15 is a cross-sectional view showing a configuration example of the retroreflective element 20 applicable to the present embodiment.

Each of FIGS. 14 to 16 is a cross-sectional view showing a configuration example of the retroreflective element 20 which is applicable to the present embodiment.

FIG. 14(a) corresponds to a configuration example in which a surface of a base 21 forms a retroreflective surface 20A. The retroreflective surface 20A corresponds to a surface which retroreflects incident light. The retroreflective surface 20A corresponds to an interface between the base 21 and the air layer. The light incident on the retroreflective element 20 does not pass through the base 21 and is reflected by the retroreflective surface 20A, as shown by an arrow in the drawing. A configuration example shown in FIG. 14(b) is different from the configuration example shown in FIG. 14(a) in that a metallic thin film 22 which covers a surface 21A of the base 21 forms the retroreflective surface 20A. The metallic thin film 22 has a substantially uniform thickness. The metallic thin film 22 is formed of, for example, a material having light reflectivity such as silver (Ag), aluminum (Al), or an aluminum alloy.

FIG. 15(a) corresponds to a configuration example in which a back surface of the base 21 forms the retroreflective surface 20A. The surface 21A of the base 21 is a flat surface. The retroreflective surface 20A corresponds to an interface between the base 21 and the air layer. After the light incident on the retroreflective element 20 has been transmitted through the base 21, it is reflected by the retroreflective surface 20A, as shown by an arrow in the drawing. A configuration example shown in FIG. 15(b) is different from the configuration example shown in FIG. 15(a) in that the metallic thin film 22 which covers a back surface 213 of the base 21 forms the retroreflective surface 20A. The inner surface 20I of the retroreflective element 20 shown in FIG. 15 is the flat surface 21A, whereby the retardation film 30 can be suitably bonded to the inner surface 20I.

FIG. 16(a) corresponds to a configuration example in which an interface between the base 21 and a cover member 24 forms the retroreflective surface 20A. A surface 24A of the cover member 24 is a flat surface. The base 21 and the cover member 24 are formed of materials having different refractive indexes, and at least the cover member 24 has optical transmissivity. The retroreflective surface 20A corresponds to the interface between the base 21 and the cover member 24. The light incident on the retroreflective element 20 is reflected by the retroreflective surface 20A after being transmitted through the cover member 24, as shown by an arrow in the drawing. A configuration example shown in FIG. 16(b) is different from the configuration example shown in FIG. 16(a) in that the metallic thin film 22 located between the base 21 and the cover member 24 forms the retroreflective surface 20A. The inner surface 20I of the retroreflective element 20 shown in FIG. 16 is the flat surface 24A, whereby the retardation film 30 can be suitably bonded to the inner surface 20I.

Next, another configuration example will be described.

FIG. 17 is an illustration for explaining yet another configuration example of the light modulating element MD. The light modulating element MD which will be described below is applicable to the display device 1 shown in FIG. 1. The configuration example shown in FIG. 17 is different from the configuration example shown in FIG. 2, etc., in that the light modulating element MD comprises a third polarizing element PL3 which is located between the first polarizing element PL1 and the liquid crystal layer 53. In the example illustrated, the third polarizing element PL3 is located between the first substrate 51 and the first polarizing element PL1. The third polarizing element PL3 includes a third transmission axis T3 parallel to the first transmission axis T1.

Also in this configuration example, the same advantage as that of the above-described configuration examples can be obtained. In addition, since external light incident on the light modulating element MD is absorbed by the third polarizing element PL3 before it reaches the first polarizing element PL1, glittering due to undesired external light reflection can be suppressed, and the display quality can be improved.

FIG. 18 is an illustration for explaining yet another configuration example of the light modulating element MD. The light modulating element MD which will be described below is applicable to the display device 1 shown in FIG. 1. The configuration example shown in FIG. 18 is different from the configuration example shown in FIG. 17 in that the first polarizing element PL1 is provided on the second polarizing element PL2.

Also in this configuration example, the same advantage as that of the above-described configuration examples can be obtained.

FIG. 19 is an illustration for explaining yet another configuration example of the light modulating element MD. The configuration example shown in FIG. 19 is different from the configuration example shown in FIG. 17 in that it is structured to allow a liquid crystal lens 5 to be formed in the liquid crystal layer 53 comprising liquid crystal molecules. Further, the second polarizing element PL2 can be omitted. Here, a structure for forming the liquid crystal lens 5 will be explained.

As shown in FIG. 19(a), the first control electrodes E1 are arranged at intervals in the first direction X, and each extend in the second direction Y. In one example, a width of each of the first control electrodes E1 along the first direction X is less than or equal to an interval between adjacent first control electrodes E1 along the first direction X. Each of the alignment films 512 and 522 is, for example, a horizontal alignment film, and is subjected to alignment treatment in the first direction X. The liquid crystal layer 53 is formed of, for example, a liquid crystal material having positive dielectric anisotropy. The first control electrode E1 and the second control electrode E2 apply a voltage, to the liquid crystal layer 53, for forming the liquid crystal lens 5 in the liquid crystal layer 53. The first transmission axis T1 of the first polarizing element PL1 and the third transmission axis T3 of the third polarizing element PL3 are parallel to the first direction X.

As shown in FIG. 19(b), when the liquid crystal lens 5 is formed, the same voltage is applied to the first control electrodes E11 and E12, and a voltage different from that applied to the first control electrodes E11 and E12 is applied to the second control electrode E2, for example. The liquid crystal molecules 53M included in the liquid crystal layer 53 are initially aligned such that their major axes are aligned in the first direction X in a state where an electric field is not formed, and are aligned such that the major axes of the liquid crystal molecules 53M are aligned along an electric field in a state where the electric field is formed. In one example, a voltage of 6V is applied to each of the first control electrodes E11 and E12, and a voltage of 0V is applied to the second control electrode E2. In regions in which the first control electrodes E11 and E12 are opposed to the second control electrode E2, an electric field along the third direction Z is formed. Therefore, the liquid crystal molecules 53M are aligned such that their major axes are aligned along the third direction Z. In a region between the first control electrode E11 and the first control electrode E12, an electric field which is tilted with respect to the third direction Z is formed. Therefore, the liquid crystal molecules 53M are aligned such that their major axes are tilted with respect to the third direction Z. In an intermediate region, which is a region intermediate between the first control electrode E11 and the first control electrode E12, an electric field is hardly formed or an electric field along the first direction X is formed. Therefore, the liquid crystal molecules 53M are aligned such that their major axes are aligned along the first direction X. The liquid crystal layer 53 has a refractive-index distribution according to an alignment state of the liquid crystal molecules 53M, a retardation distribution, or a phase distribution. The liquid crystal lens 5 shown by a dotted line in the drawing is one that is formed by the refractive-index distribution, retardation distribution, or phase distribution mentioned above. The illustrated liquid crystal lens 5 functions as a convex lens.

Here, the first linearly polarized light POL1 is shown by an arrow having a horizontal stripe pattern in the drawing, and the second linearly polarized light POL2 is shown by an arrow having a slanting stripe pattern in the drawing. The external light L0 is, for example, natural light having random oscillation planes, and the external light L0 enters from an outer surface 521A of the insulating substrate 521, and travels from the second substrate 52 toward the first substrate 51. Of the external light L0, the liquid crystal lens 5 transmits the second linearly polarized light POL2 without practically refracting it, and refracts the first linearly polarized light POL1. In other words, the liquid crystal lens 5 exhibits a focusing function on mainly the first linearly polarized light POL1.

Returning to FIG. 19(a), the configuration example will be explained again. Since the second linearly polarized light POL2, which has been transmitted through the liquid crystal lens 5, is absorbed by the third polarizing element PL3, the second linearly polarized light POL2 does not pass through the light modulating element MD. Meanwhile, the first linearly polarized light POL1 refracted by the liquid crystal lens 5 can be transmitted through the third polarizing element PL3 and the first polarizing element PL1. Here, after the first linearly polarized light POL1 has been converged to a position relatively near the light modulating element MD, the first linearly polarized light POL1 is diverged. Since the first linearly polarized light POL1 converged by the respective liquid crystal lenses 5 are diverged, a scattering state is produced, and transparency of the light modulating element MD is decreased. In other words, the light modulating element MD in a state in which the liquid crystal lenses 5 are formed is substantially in the second transmittance state.

According to the configuration example as described above, the light modulating element MD is configured to switch the state between the off-state in which no voltage is applied to the liquid crystal layer 53 being the first transmittance state (transparent state) and the on-state in which a voltage is applied to the liquid crystal layer 53 for forming the liquid crystal lenses 5 being the second transmittance state (scattering state). Accordingly, also in this configuration example, the same advantage as that of the above configuration examples can be obtained.

Figure 20:
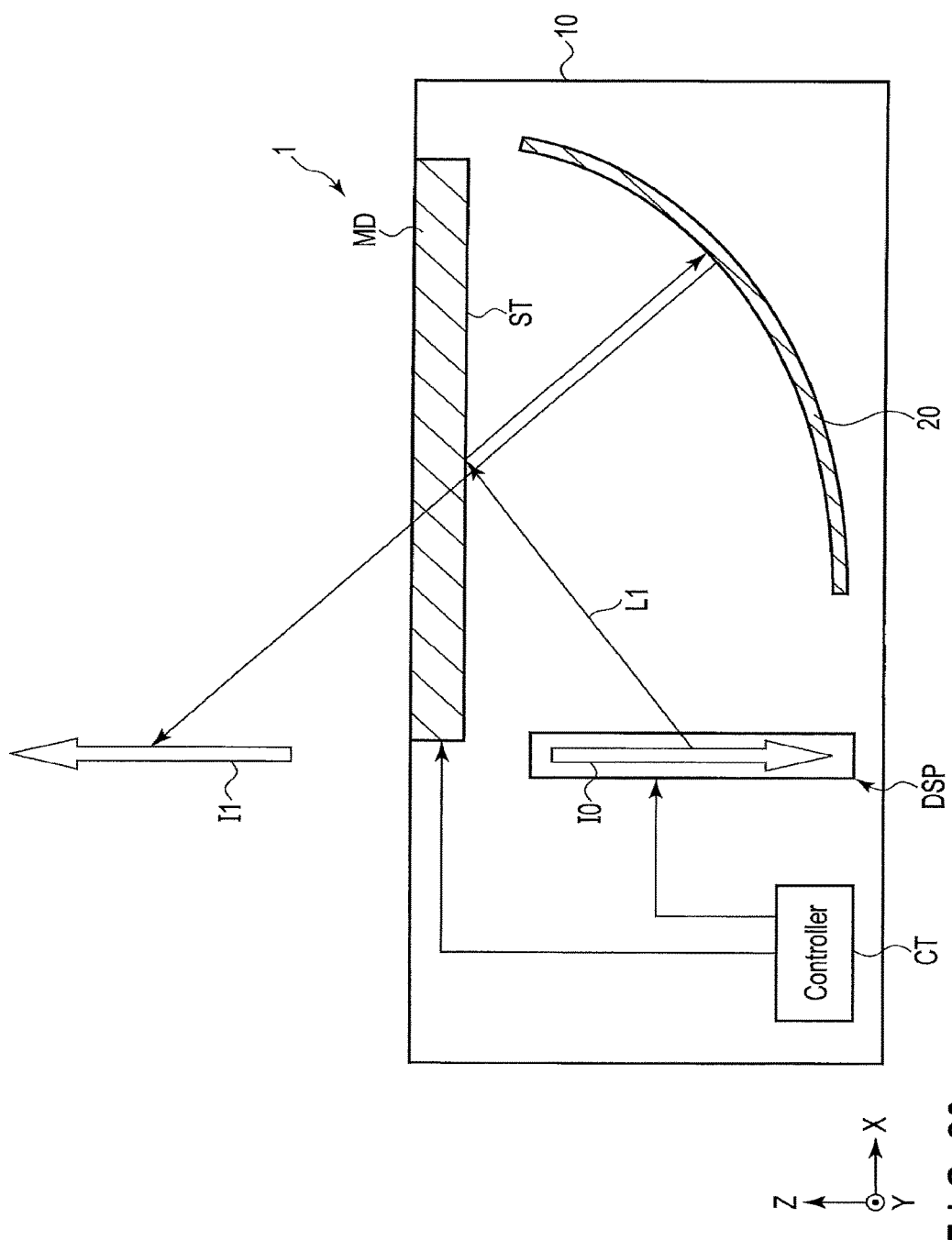
FIG. 20 is an illustration showing another configuration example of the display device 1 of the present embodiment.

FIG. 20 is an illustration showing another configuration example of the display device 1 of the present embodiment. The configuration example shown in FIG. 20 is different from the configuration example illustrated in FIG. 1 in that the light modulating element MD comprises a semi-transmissive layer ST. The semi-transmissive layer ST is a layer which reflects part of the incident light and transmits the other incident light, and in one example, the reflectance and transmittance of the semi-transmissive layer ST are substantially the same. The semi-transmissive layer ST can be formed of a metal material such as aluminum (Al), silver (Ag), or chromium (Cr), or may be alternatively formed of a multilayer film obtained by stacking various thin films. Further, in order to suppress degradation of reliability caused by corrosion, etc., the semi-transmissive layer ST may be covered with a protective film. In one example, the semi-transmissive layer ST is a half mirror which transmits approximately 50% of the incident light, and reflects approximately 50% of the same, irrespective of the polarization state of the incident light. In this case, the display light L1 emitted from the display unit DSP need not be linearly polarized light or circularly polarized light, and may be natural light. However, from the standpoint of improving the light use efficiency, the display light L1 should preferably be linearly polarized light which is parallel to the transmission axis of the polarizing element to be provided on the inner surface side of the light modulating element MD. The retardation film 30 is omitted. The housing 10, the retroreflective element 20, and the display unit DSP are similar to those of the configuration example shown in FIG. 1.

FIG. 21 is an illustration showing a configuration example of the light modulating element MD shown in FIG. 20.

The light modulating element MD comprises the insulating substrate 511, the first control electrode E1, the alignment film 512, the insulating substrate 521, the second control electrode E2, the alignment film 522, the liquid crystal layer 53, the second polarizing element PL2, and the third polarizing element PL3. At least one of the first control electrode E1 and the second control electrode E2 is the above-described semi-transmissive layer. The second polarizing element PL2 and the third polarizing element PL3 may be a reflective polarizing filter or an absorptive polarizing filter.

FIG. 22 is an illustration for explaining the function of the light modulating element MD shown in FIG. 21. In FIG. 22, the right part corresponds to a case where the light modulating element MD is in the off-state, and the left part corresponds to a case where the light modulating element MD is in the on-state. In the example illustrated, the first control electrode E1 is the semi-transmissive layer ST, and the second transmission axis T2 of the second polarizing element PL2 and the third transmission axis T3 of the third polarizing element PL3 are both parallel to the second direction Y. The remaining parts are similar to those of the configuration example shown in FIG. 5.

In the on-state, the light modulating element MD is set to the transparent state or first transmittance state (the first mode). The display light L1 emitted from the display unit DSP is transmitted through the third polarizing element PL3. If the display light L1 is the second linearly polarized light POL2, substantially 100% of the display light L1 is transmitted through the third polarizing element PL3. After part of the display light L1 has been reflected by the first control electrode E1, the display light L1 is retroreflected by the retroreflective element 20. Further, part of the retroreflected display light L1 is transmitted through the first control electrode E1, and passes through the liquid crystal layer 53 while maintaining its polarization plane because it is hardly affected by the vertically aligned liquid crystal molecules 53M. The second linearly polarized light POL2 transmitted through the liquid crystal layer 53 passes through the second polarizing element PL2. Further, the display light L1 forms an image as the aerial image. An observer can observe the second linearly polarized light POL2 transmitted through the light modulating element MD in the transparent state as the aerial image I1 floating in air, as shown in FIG. 6.

Meanwhile, in the off-state, the light modulating element MD is set to the untransparent state or second transmittance state (the second mode). Of the external light L0 incident on the light modulating element MD, the second linearly polarized light POL2 which is transmitted through the second polarizing element PL2 is affected by the twistedly aligned liquid crystal molecules 53M and its polarization plane is rotated. Thus, the second linearly polarized light POL2 is converted into the first linearly polarized light POL1. Part of the converted first linearly polarized light POL1 is transmitted through the first control electrode E1, but does not pass through the third polarizing element PL3. Accordingly, the light modulating element MD is brought into the untransparent state or second transmittance state. Accordingly, when the light modulating element MD is observed, the observer cannot practically visually recognize the display unit DSP, the retroreflective element 20, the retardation film 30, and the like, from the outside through the light modulating element MD, as shown in FIG. 7. Note that in such an off-state, the display unit DSP does not emit the display light.

Also in this configuration example, the same advantage as that of the above-described configuration examples can be obtained. In addition, control of the polarization state of the light becomes unnecessary, and the retardation film can be omitted.

FIG. 23 is an illustration for explaining yet another configuration example of the light modulating element MD. The light modulating element MD which will be described below is applicable to the display device 1 shown in FIG. 20. The configuration example shown in FIG. 23 is different from the configuration example illustrated in FIG. 21 in that the light modulating element MD comprises the semi-transmissive layer ST separately. In this configuration example, the first control electrode E1 and the second control electrode E2 may both be a transparent electrode or at least one of them may be a semi-transmissive layer though not described in detail. In the example illustrated, the semi-transmissive layer ST is located between the first substrate 51 and the third polarizing element PL3.

Also in this configuration example, the same advantage as that of the above-described configuration examples can be obtained.

FIG. 24 is an illustration for explaining yet another configuration example of the light modulating element MD. The light modulating element MD which will be described below is applicable to the display device 1 shown in FIG. 20. The configuration example shown in FIG. 24 is different from the configuration example shown in FIG. 23 in that the semi-transmissive layer ST is located between the second substrate 52 and the second polarizing element PL2.

Also in this configuration example, the same advantage as that of the above-described configuration examples can be obtained. Note that this configuration example may be combined with the configuration example shown in FIG. 23, and the light modulating element MD may comprise a plurality of semi-transmissive layers ST.

Figure 25:
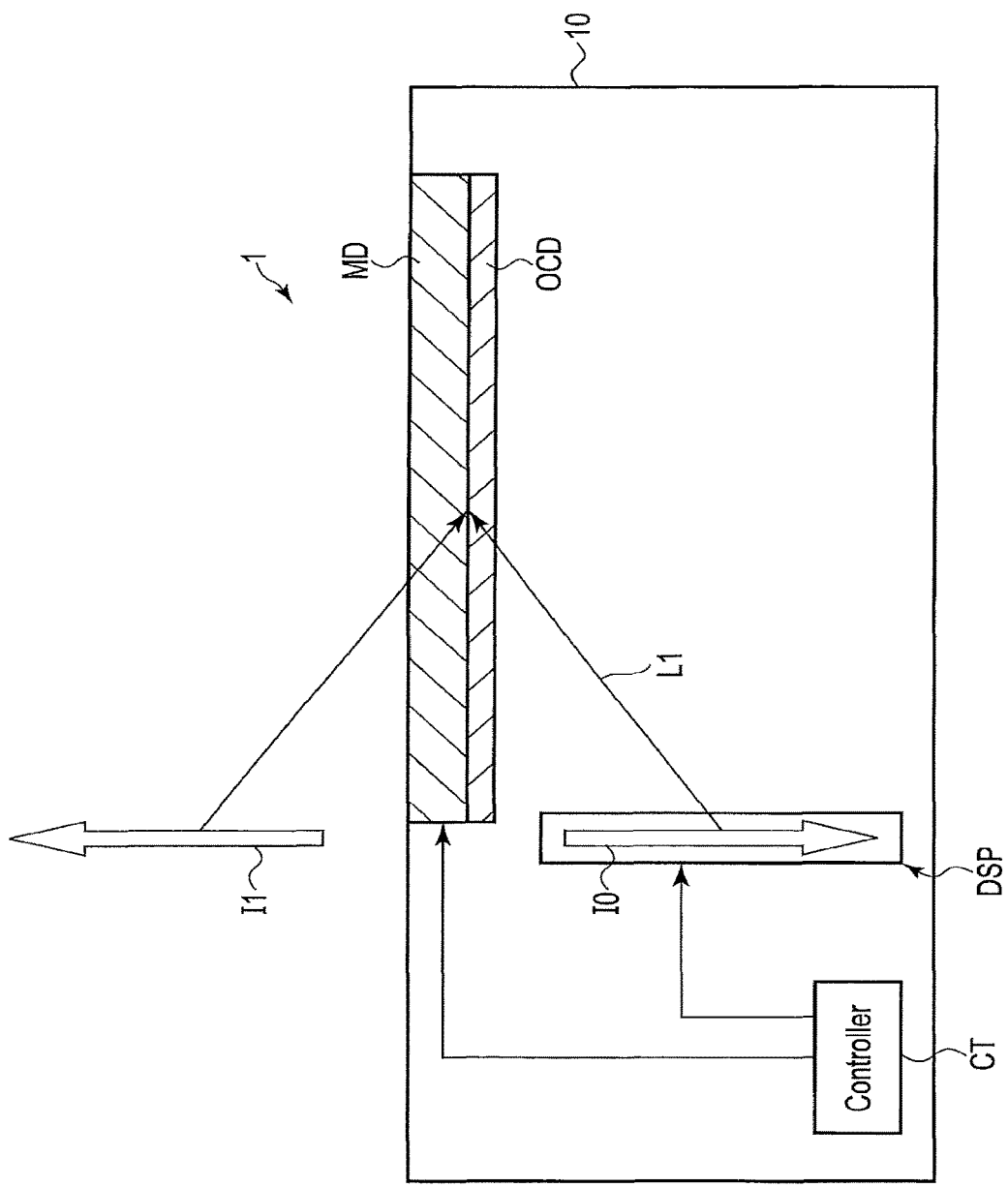
FIG. 25 is an illustration showing another configuration example of the display device 1 of the present embodiment.

FIG. 25 is an illustration showing yet another configuration example of the display device 1 of the present embodiment. The configuration example shown in FIG. 25 is different from the configuration example illustrated in FIG. 1 in that an optical coupling element OCD is provided instead of the retroreflective element. The light modulating element MD and the optical coupling element OCD are opposed to each other, and may be formed integrally. The optical coupling element OCD comprises two light control panels. Each of the light control panels comprises a planar light-reflecting portion. The planar light-reflecting portion has a dihedral corner reflector array structure in which two adjacent surfaces are orthogonal to each other. Such an optical coupling element OCD forms the aerial image I1 at a plane-symmetrical position of the display image I0 of the display unit DSP with the optical coupling element OCD in between. The light modulating element MD is set to the first transmittance state at a display period when the display unit DSP emits the display light L1, and is set to the second transmittance state having a transmittance lower than the first transmittance at a non-display period when the display unit DSP does not emit the display light.

Also in this configuration example, the same advantage as that of the above-described configuration examples can be obtained.

As described above, according to the present embodiment, a neat and simple looking display device can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
   a light modulating element which transmits or reflects incident light;
   a display unit which emits display light toward the light modulating element; and
   a retroreflective element which retroreflects the display light reflected from the light modulating element,
   the light modulating element including an inner surface on a side opposed to the display unit and the retroreflective element, and an outer surface on a side opposite to the inner surface,
   the light modulating element comprising a first mode of transmitting light incident from the outer surface at a first transmittance, and a second mode of transmitting the light incident from the outer surface at a second transmittance lower than the first transmittance,
   wherein the light modulating element comprises:
   a first polarizing element which is located on a side closer to the inner surface, and includes a first transmission axis which reflects first linearly polarized light and transmits second linearly polarized light crossing the first linearly polarized light;

a second polarizing element including a second transmission axis;
a first substrate comprising a plurality of first control electrodes;
a second substrate comprising a second control electrode opposed to the plurality of first control electrodes; and
a liquid crystal layer which is located between the first polarizing element and the second polarizing element, and is held between the first substrate and the second substrate.

2. The display device of claim 1, wherein the display unit emits the display light in the first mode, and does not emit the display light in the second mode.

3. The display device of claim 1, wherein the light modulating element further comprises a third polarizing element which is located between the first polarizing element and the liquid crystal layer, and includes a third transmission axis parallel to the first transmission axis.

4. The display device of claim 1, further comprising a retardation film which imparts a retardation to transmitted light, wherein
the retardation film is arranged along an inner surface of the retroreflective element.

5. The display device of claim 1, wherein
at least one of the first control electrode and the second control electrode is a semi-transmissive layer.

6. The display device of claim 1, wherein the light modulating element comprises:
a semi-transmissive layer located between the first polarizing element and the second polarizing element.

7. The display device of claim 1, wherein the light modulating element comprises:
a controller which controls a voltage to be applied to the liquid crystal layer for forming a liquid crystal lens in the liquid crystal layer, and
the controller applies a voltage for forming the liquid crystal lens to the liquid crystal layer in the second mode, and does not apply a voltage to the liquid crystal layer in the first mode.

8. A display device comprising:
a light modulating element which transmits or reflects incident light;
a display unit which emits display light toward the light modulating element;
a retroreflective element which retroreflects the display light reflected from the light modulating element; and
a controller which controls the light modulating element,
the controller setting the light modulating element to a first transmittance state having a first transmittance at a display period when the display unit emits the display light, and setting the light modulating element to a second transmittance state having a second transmittance of which is lower than the first transmittance, at a non-display period when the display unit does not emit the display light.

9. The display device of claim 8, wherein the light modulating element comprises:
a first polarizing element including a first transmission axis;
a second polarizing element including a second transmission axis; and
a liquid crystal layer located between the first polarizing element and the second polarizing element, and
the controller applies a voltage to the liquid crystal layer in the first transmittance state, and does not apply a voltage to the liquid crystal layer in the second transmittance state.

10. The display device of claim 9, wherein a retardation of the liquid crystal layer in the first transmittance state is substantially zero, and the second transmission axis is parallel to the first transmission axis.

11. The display device of claim 9, wherein:
a retardation of the liquid crystal layer in the first transmittance state is substantially $\lambda/2$, where $\lambda$ is a wavelength of light transmitted through the liquid crystal layer; and
the second transmission axis crosses the first transmission axis.

12. The display device of claim 8, wherein the light modulating element comprises:
a first polarizing element including a first transmission axis which reflects first linearly polarized light, and transmits second linearly polarized light crossing the first linearly polarized light;
a second polarizing element including a second transmission axis;
a first substrate comprising a plurality of first control electrodes;
a second substrate comprising a second control electrode opposed to the plurality of first control electrodes; and
a liquid crystal layer which is located between the first polarizing element and the second polarizing element, and is held between the first substrate and the second substrate.

13. The display device of claim 8, further comprising a retardation film which imparts a retardation to transmitted light, wherein
the retardation film is arranged along an inner surface of the retroreflective element.

14. The display device of claim 8, wherein the light modulating element comprises:
a first polarizing element including a first transmission axis;
a second polarizing element including a second transmission axis;
a first substrate comprising a plurality of first control electrodes;
a second substrate comprising a second control electrode opposed to the plurality of first control electrodes; and
a liquid crystal layer which is located between the first polarizing element and the second polarizing element, and is held between the first substrate and the second substrate, and
at least one of the first control electrode and the second control electrode is a semi-transmissive layer.

15. The display device of claim 8, wherein the light modulating element comprises:
a first polarizing element including a first transmission axis;
a second polarizing element including a second transmission axis;
a first substrate comprising a plurality of first control electrodes;
a second substrate comprising a second control electrode opposed to the plurality of first control electrodes;
a liquid crystal layer which is located between the first polarizing element and the second polarizing element, and is held between the first substrate and the second substrate; and
a semi-transmissive layer located between the first polarizing element and the second polarizing element.

16. The display device of claim 8, wherein the light modulating element comprises:

a first substrate comprising a plurality of first control electrodes;

a second substrate comprising a second control electrode opposed to the plurality of first control electrodes; and a liquid crystal layer held between the first substrate and the second substrate, the controller controls a voltage to be applied to the liquid crystal layer for forming a liquid crystal lens in the liquid crystal layer, and the controller applies a voltage for forming the liquid crystal lens to the liquid crystal layer in the second transmittance state, and does not apply a voltage to the liquid crystal layer in the first transmittance state.

* * * * *